United States Patent
Taylor, Jr. et al.

(10) Patent No.: US 8,806,344 B1
(45) Date of Patent: Aug. 12, 2014

(54) SYSTEM AND METHOD OF DISPLAYING ELECTRONIC DATABASE REPORTS

(76) Inventors: Lawrence Taylor, Jr., Big Lake, AK (US); Christophery R. Curry, Anchorage, AK (US)

(*) Notice: Subject to any disclaimer, the term of this patent is extended or adjusted under 35 U.S.C. 154(b) by 259 days.

(21) Appl. No.: 13/478,579

(22) Filed: May 23, 2012

(51) Int. Cl.
*G06F 17/30* (2006.01)
*H04L 29/08* (2006.01)

(52) U.S. Cl.
CPC .... *G06F 17/30902* (2013.01); *G06F 17/30861* (2013.01); *G06F 17/30182* (2013.01); *G06F 17/30386* (2013.01); *H04L 67/02* (2013.01); *H04L 67/2842* (2013.01)
USPC ........... 715/733; 715/738; 715/748; 715/749; 709/217; 709/239

(58) Field of Classification Search
CPC ..................... G06F 17/30902; G06F 17/30861; G06F 17/30182; G06F 17/30386; H04L 62/02; H04L 62/2842
USPC ........... 715/733, 738, 748, 749; 709/217, 239
See application file for complete search history.

(56) References Cited

U.S. PATENT DOCUMENTS

| | | | |
|---|---|---|---|
| 7,096,417 B1* | 8/2006 | Bennett et al. | 715/207 |
| 2001/0003828 A1* | 6/2001 | Peterson et al. | 709/219 |
| 2007/0101061 A1* | 5/2007 | Baskaran et al. | 711/118 |
| 2010/0114906 A1* | 5/2010 | Yuan et al. | 707/747 |

* cited by examiner

*Primary Examiner* — Ting Lee
(74) *Attorney, Agent, or Firm* — Michael J Tavella

(57) ABSTRACT

A system for displaying files over a local area network or over the Internet. The method includes the steps of defining headings for either non-comparative information or comparative information within any company or government entity or within any vertical market, listing either hierarchical information or the products or services of vendors in a vertical market, including vendors that do not have a Web presence, and providing a means of soliciting products or services or other information not listed. The step of displaying files eliminates the wait for the latency period of successive server round trips after the first server round trip, saving user functional engagement time. The method allows the user to disconnect the user computer from the Internet once all database information files are downloaded, and, since any subsequent information files viewed are resident in the user computer, the current method is faster than existing methods.

7 Claims, 21 Drawing Sheets

SYSTEM AND METHOD OF DISPLAYING ELECTRONIC DATABASE REPORTS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to electronic displays, specifically, to an improved method of displaying electronic database reports via either an intranet or the Internet.

2. Description of the Prior Art

While the speed of searching the Internet for products and services is increasing, there is a technical difficulty that slows the ability of computer users to view the information in downloadable files. When a user accesses an Internet website on the World Wide Web, the user computer establishes a link to the website host server using a Full Process HTTP GET Request. A process is an execution path through one or more programs. The process has an execution start and a dispatching priority. The unit of dispatching is usually referred to as a "thread" or a "lightweight process". When this link to the server is established, in what can be called a "handshake," the server and the computer exchange identifying information, and this handshake allows the server to transmit information that then appears on the computer screen for the user to view. At the end of this process, when the screen display is complete, the server and computer let go of the handshake. When this information is a collection of reports from a database, and the database contains more reports than can be displayed on the computer screen at the same time, then all of the reports are not transmitted and displayed at once, but words or other displays representing each one of the additional reports may be displayed on the computer screen. These representations are electronic links to the additional database report files available on the server. If the user wants to access additional files, the user must click on one of the links and wait for the user computer to execute another Full Process HTTP GET Request, establish a handshake with the server, and download the file. The communication from the user click to the user receiving the file contents is called the "server round trip." The time it takes to complete the server round trip is called the "latency period." For each latency period, establishing the connection, the handshake, may take most of the time. Users must wait during the latency period before viewing the requested information.

An example of this system, found in the prior art, is Sabre Holdings Corporation's website, "Travelocity", which is used for making airplane travel reservations. The user submits airports and dates as a query to the server. The server searches its database for combinations of flights for that query and produces a database report. When the user chooses a flight, the user has to wait while the computer interacts with the server to find and display the requested detailed information. If the user changes dates, the user has to wait while the user computer again queries the Web server for a new database report of possible flights.

Another problem in the prior art is that there are websites that compare products and services in a vertical market in detail; but a vendor in that market cannot automatically submit their own product or service for the public to view on a single web page, together with the other products or services available in that vertical market. An example of a vertical market is any aggregation of vendors and their users of one type or class of product or service. Examples of vertical markets include: laboratory testing, pharmaceuticals, travel, stocks and bonds, bulk chemicals, and airlines. A good example of vertical markets includes all markets commonly delineated as categories in a telephone yellow pages directory. Today, there are some yellow pages websites that list vendors in a vertical market; however, they continue to look like their physical counterparts and do not show details of the items unless the user clicks on links to the individual websites of those vendors. This again causes the user to wait each time the user clicks on a link and moves to another website and downloads information. In addition, moving to other websites may cause the user to have difficulty backtracking to the website of original interest, becoming lost.

A third problem in the prior art is that there is no system for finding services or products that are not available on the World Wide Web. Rather, the web is limited only to products or services already represented on line.

There are two methods in the prior art that are methods of downloading files for display on computers. These are Nawaz (U.S. Pat. No. 5,959,621, Sep. 28, 1999) and, PointCast, which is a method described in Nawaz. The PointCast and Nawaz methods require the user to download the respective application program software to the user computer and install that application. Nawaz adds the additional step of integrating it with the user desktop, before the user is able to download and view the downloaded information. In addition, Nawaz includes a marquee on a computer screen to present the user with links to files the user can select on a server computer to download and view information. Each time the user selects such a link, however, the user still has the problem of having to wait for the latency period of successive Full Process HTTP GET Request server round trips. Because the information files reside on servers remote from the user's computer, the user must keep the user's computer connected to the Internet while continuing to research the links using the Nawaz or PointCast methods.

BRIEF DESCRIPTION OF THE INVENTION

The present system provides a method of downloading, selecting, and displaying electronic files on a computer that avoids the wait for the latency period of successive Full Process HTTP GET Request server round trips. In the instant invention, an electronic file download is initiated with a single Full Process HTTP GET Request. Unlike the prior art, however, there is no need for subsequent Full Process HTTP GET Requests because files are requested and downloaded automatically using threads of a Java applet, which are small process HTTP GET requests and do not require the latency period experienced with a Full Process GET request. Using this system, the original handshake information established during the single Full Process HTTP GET request is maintained while all database files are downloaded from the server and stored in a user's computer database. A phrase in a marquee displayed on the user's computer screen represents each stored file. Initially, the Web server preselects a startup phrase and the file associated with the startup phrase is presented in a grid display that introduces the website. Then, all other needed database files are downloaded in the background. Once downloading is complete, the user can disconnect from the Internet. While disconnected, the user can use the browser to review the files on a simulation of the website. By selecting a new phrase in the marquee with a user feedback tool (e.g., a cursor controlled by a mouse or a finger on a touch screen) the grid displays the files associated with the new phrase without experiencing any delay. There is no delay because all of the files are cached in the user's memory. Thus, this method avoids the delay of a server round trip whenever the user selects a new phrase to view a new information file in the database report.

This method also provides a process for vendors to list products and services in their vertical market so that they can be viewed by the user and compared on the same Web page, without requiring navigation to other websites, which can confuse the user in a complex sequence of Web pages. Moreover, the display is easy to navigate because it allows information selection and presentation without leaving an identical representation of the home page of the website. Finally, the system also supports inquiries for products or services not found, even when not available on any website.

It is an object of the invention to provide database contents that can be viewed without waiting for successive latency periods, saving time.

It is a further object of the invention to provide a system in which information can be listed by vendors and viewed without leaving the website home page or its simulation, simplifying navigation.

It is yet a further object of the invention to provide a system in which there is a process for requesting items not initially found.

It is yet a further object of the invention to provide a system in which vendors can submit a listing to advertise complex technological products or services in their vertical market, including providing a separate column for vendor-defined descriptions.

It is yet a further object of the invention to provide a system in which vendors can present photographs, movies, writings, products, or services as part of the display.

It is yet a further object of the invention to provide a system in which vendors who have no website can advertise on the World Wide Web.

It is yet a further object of the invention to provide a system in which vendors who have a website, but have their product information buried deep within their website, can advertise that product information on the first page of a website.

It is yet a further object of the invention to provide a system in which users can compare products and services using categories such as price, location, and description.

It is yet a further object of the invention to provide a system in which a Web architect is able to create column headings to present information consistently within any single vertical market.

DETAILED DESCRIPTION OF THE INVENTION

Comparing the instant invention to the example above, i.e., of Sabre Holdings Corporation's website, in one possible implementation of the present method, the user selects a departure city, destination city, and departure date. Information regarding flights for those choices is displayed. Any change in dates would not have to be submitted as a query to the server, but are displayed in a database report from the information already transmitted from the web server to the user computer, which saves time.

Figure 1:
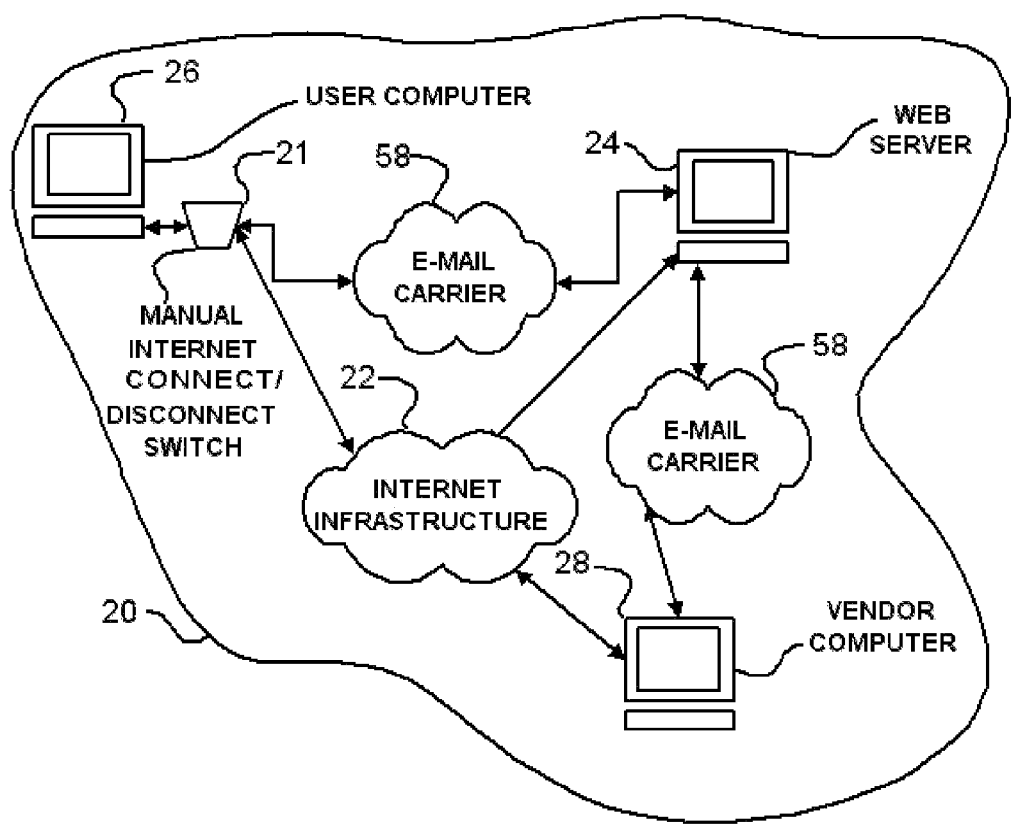
FIG. 1 is a schematic diagram of a first illustrative embodiment of the present method.

Referring now to the drawing figures, and particularly to FIG. 1, a schematic diagram of a first illustrative embodiment of a method of displaying electronic database reports is shown. The present method comprises a set of process steps operating through a system that includes one of a multiplicity of user computers 26, connected, using Internet infrastructure 22 and a manual connect/disconnect switch 21, to a Web server 24 that provides database reports to a user's computer. Note that herein the term computer means any electronic device having a display means and a user action control. These include, but are not limited to a desktop computer, a laptop computer, a tablet or a smart phone. In addition, the term "cursor" as used herein means any control means and included but is not limited to movement of a cursor on a screen as manipulated by a computer mouse, the use of the tab key, a finger touching a pressure sensitive computer, a finger touching a capacitive touch screen device on a desktop computer or mobile device e.g., laptop computers, smart phones and tablets, or any other equivalent action. Similarly when the terms "mousing over" or "moused over" are used, it too includes all of the possible variations listed above within it.

When there is communication, the telecommunication protocol can be HTTP, TCP/IP sockets, XML, or other methods. However, the preferred method of the present embodiment is HTTP. The database contents are submitted to the Web server 24 by a multiplicity of vendor computers 28 through the Internet 22. The Web server also communicates with user computer 26 and vendor computer 28 through e-mail carrier 58.

Figure 2A:
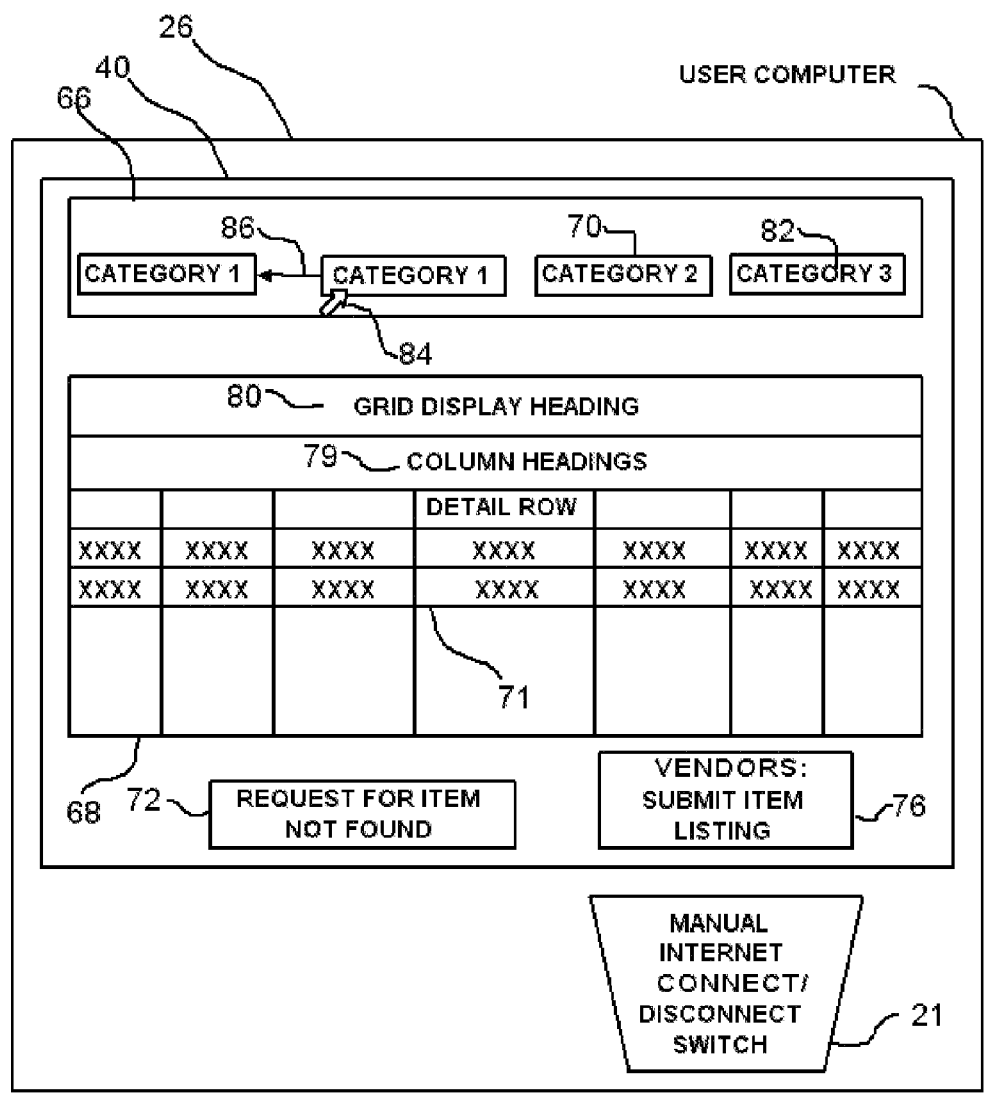
FIG. 2A is a schematic representation of a conventional website presented on a user computer.

FIG. 2A is a schematic representation of user computer 26 where the process steps are initiated and where resultant database reports and forms are displayed. This computer has a manual Internet connect/disconnect switch 21, an Internet browser with Java virtual machine 40, a marquee display 66, and a grid display 68. Also on the browser screen is a "request for item not found" button 72, and a "vendors: submit item listing" button 76. When this button is clicked, an "item not found form" opens. FIG. 2C shows this form. When the "vendors: submit item listing" button is clicked an "advertising listing form" opens. This form is shown in FIG. 2D.

Returning to FIG. 2A, on marquee display 66 are three of a plurality of hotzones 70, and, within each of the hotzones, is marquee category 82, which can also be called a "phrase". The hotzone may consist of, but is not limited to, text, raster graphics, or buttons, which are common iconic visual representations of user interface controls. There is an arrow 86, pointing from marquee category 1 in one hotzone to another hotzone, also named marquee category 1. This arrow represents movement. The movement may be in any direction or manner, such as bouncing, or it may be holding still if there are few enough categories to be displayed without motion. The preferred movement is scrolling of the hotzones and their attendant marquee categories from right to left. In addition, pointing to one of the categories in one of the hotzones is user cursor 84. The cursor, or mouse cursor, is a feedback tool that tells a user where he or she is on the website. User feedback tools may consist of, but are not limited to, cursors, arrows, or pens, but are herein called cursors. On grid display 68 are grid display headings 80, column headings 79, and two of a multiplicity of detail rows 71, consisting of a series of Xs within separate columns, which represent words, numbers, photographs, or any other representation of the information being displayed in the detail rows. Any other type of information designator, such as color, position, or symbol, may represent column headings.

Figure 2B:
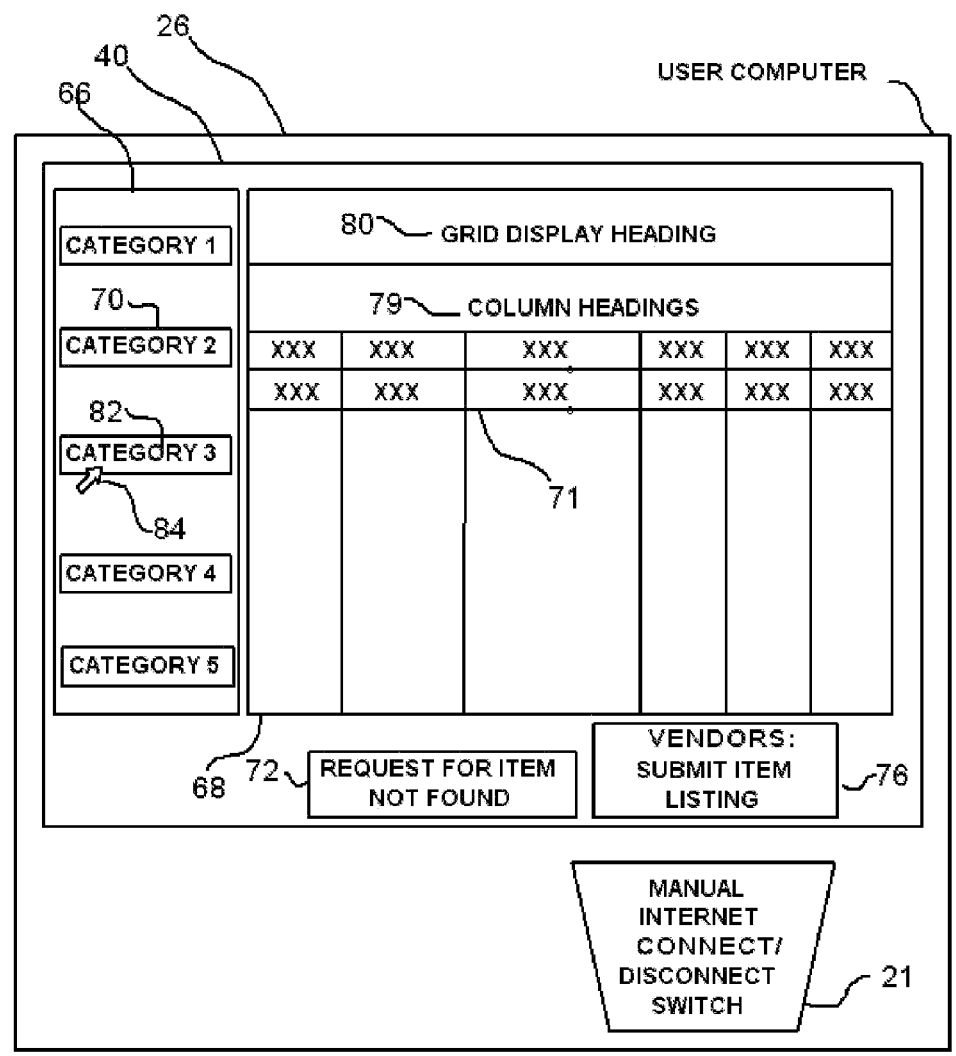
FIG. 2B is a schematic representation of a special case of the conventional website presented in FIG. 2A.
Figure 2C:
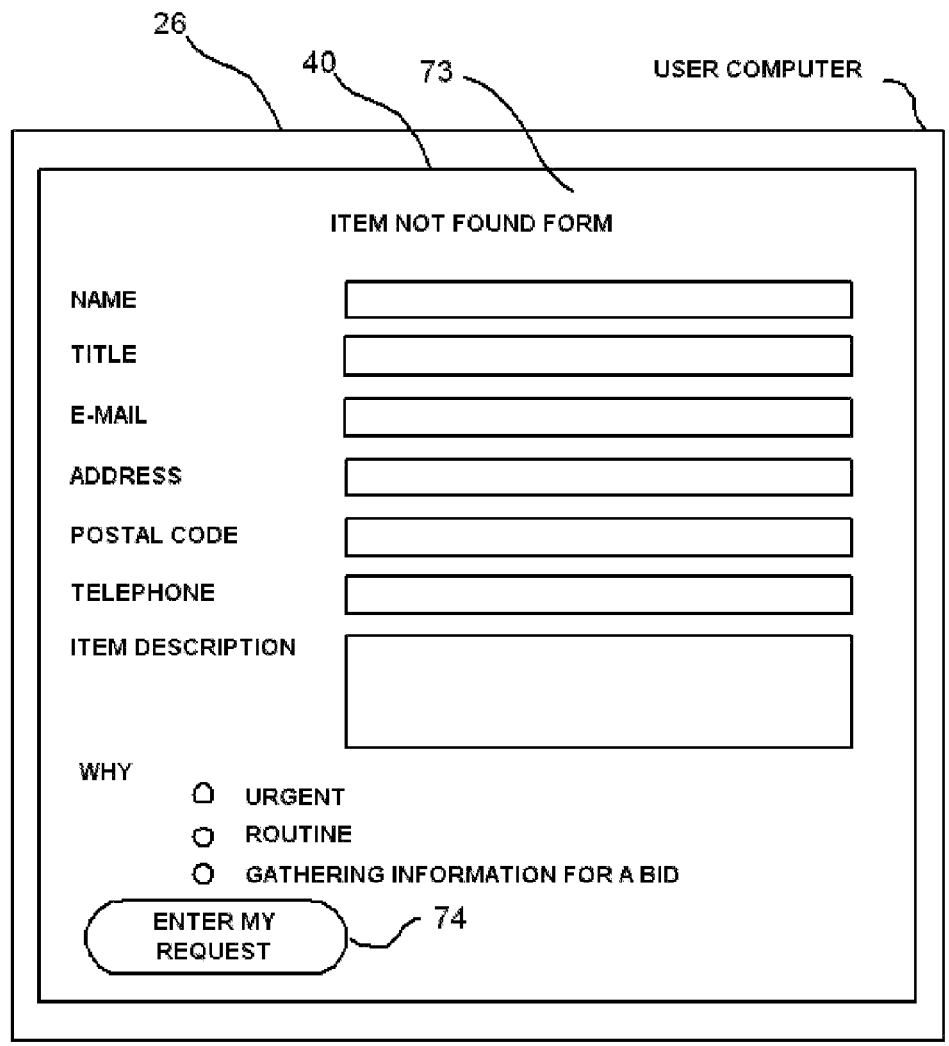
FIG. 2C is a schematic representation of a request form for items not found presented on a user computer.
Figure 2D:
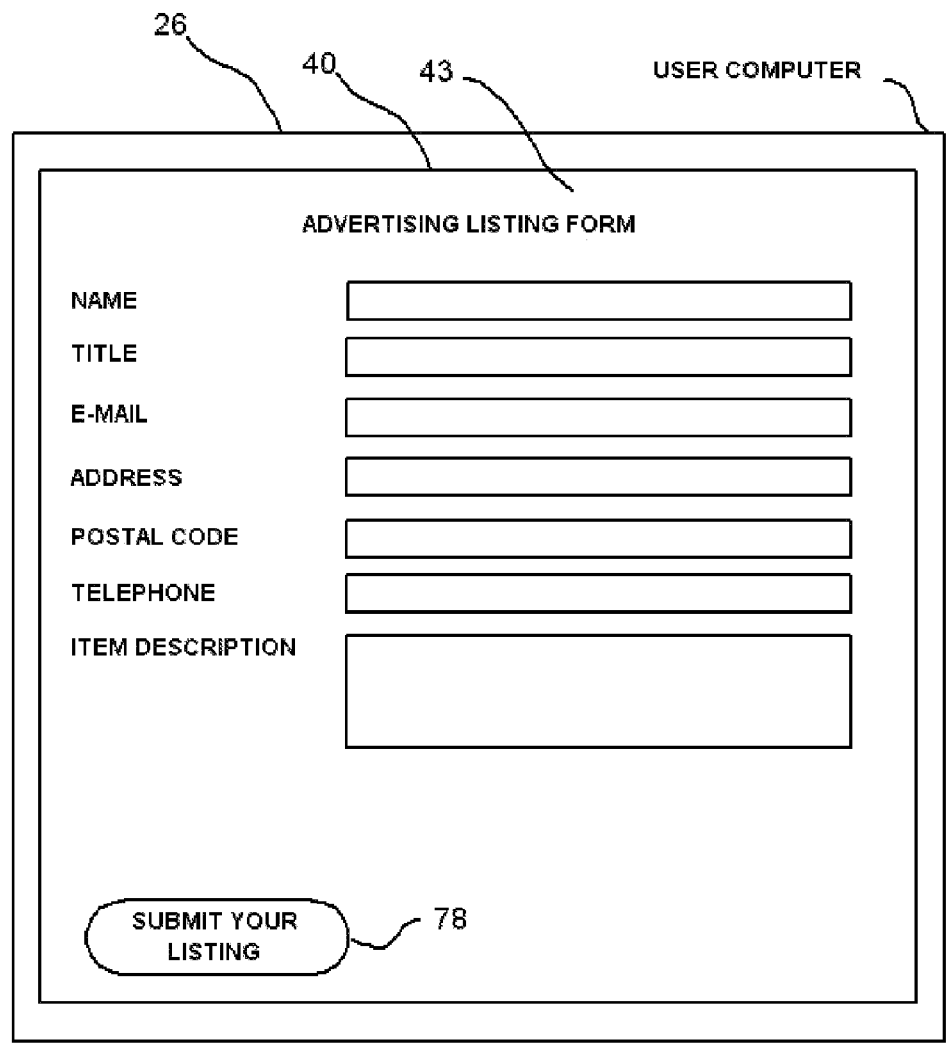
FIG. 2D is a schematic representation of an advertising listing form presented on a user computer.

FIG. 2B is the special case of FIG. 2A. In FIG. 2B five of a plurality of hotzones 70 and marquee categories 82 are not moving, unlike those of FIG. 2a. The preferred orientation in this special case is for marquee display 66 to be displayed in a vertical column on the left of the computer display, although the marquee display may be in any other orientation. As in FIG. 2A, FIG. 2B is a schematic representation of user computer 26 where the process steps are initiated and where resultant database reports and forms are displayed. This computer has a manual Internet connect/disconnect switch 21, an Internet browser with Java virtual machine 40, a marquee display 66, and a grid display 68. Also on the browser screen is a "Request for Item Not Found" button 72, and a "Vendors: Submit Item Listing" button 76. When the Request for Item Not Found button is clicked, "Item Not Found Form" 73 opens. FIG. 2C shows this form. When the "Vendors: Submit Item Listing" button is clicked "Advertising Listing Form" 43 opens. This form is shown in FIG. 2D.

Returning to FIG. 2B, on marquee display 66 are five of a plurality of hotzones 70, and, within each of the hotzones, is marquee category 82. In addition, pointing to one of the categories in one of the hotzones is user cursor 84. In FIG. 2B there is no arrow representing movement of the hotzones and marquee categories because this is a static marquee display, which is the principle functional difference from FIG. 2A. On grid display 68 are grid display headings 80, column headings 79, and two of a multiplicity of detail rows 71, consisting of a series of Xs within separate columns. As before, these "Xs" represent words, numbers, photographs, or any other representation of the information being displayed in the detail rows.

The use of the instant invention as represented in FIG. 2B is illustrative in that the client moves the cursor up or down the vertical column of static marquee categories, as the cursor touches each marquee category, the database report, including the plurality of files contained in the report represented by the marquee category, appears, with no delay, in the grid display.

FIG. 2C is a representation of "Item Not Found Form" 73. This form is displayed on the user computer screen when the user presses the "request for item not found" button 72 in either FIG. 2A or FIG. 2B. The user fills in self-explanatory fields such as "Name", "E-Mail", and an "Item Description". There are also a number of "radio buttons" under the word "Why" that are used to indicate the purpose and status of the query such as "urgent", "routine", "gathering information for a bid", or any other status. This facilitates construction of the request that will be sent to vendors. After the form is filled in, the user initiates a process step by using the "Enter my request" button 74. When this button is pressed, the request form process submits the form to the web server.

FIG. 2D is a representation of "Advertising Listing Form"43. The vendor fills in self-explanatory fields such as "Name", "E-Mail", and an "Item Description". After the form is filled in, the vendor initiates a process step by using the "Submit your listing" button 78. When this button is pressed, the vendor form process submits the form to the web server.

Figure 3A:
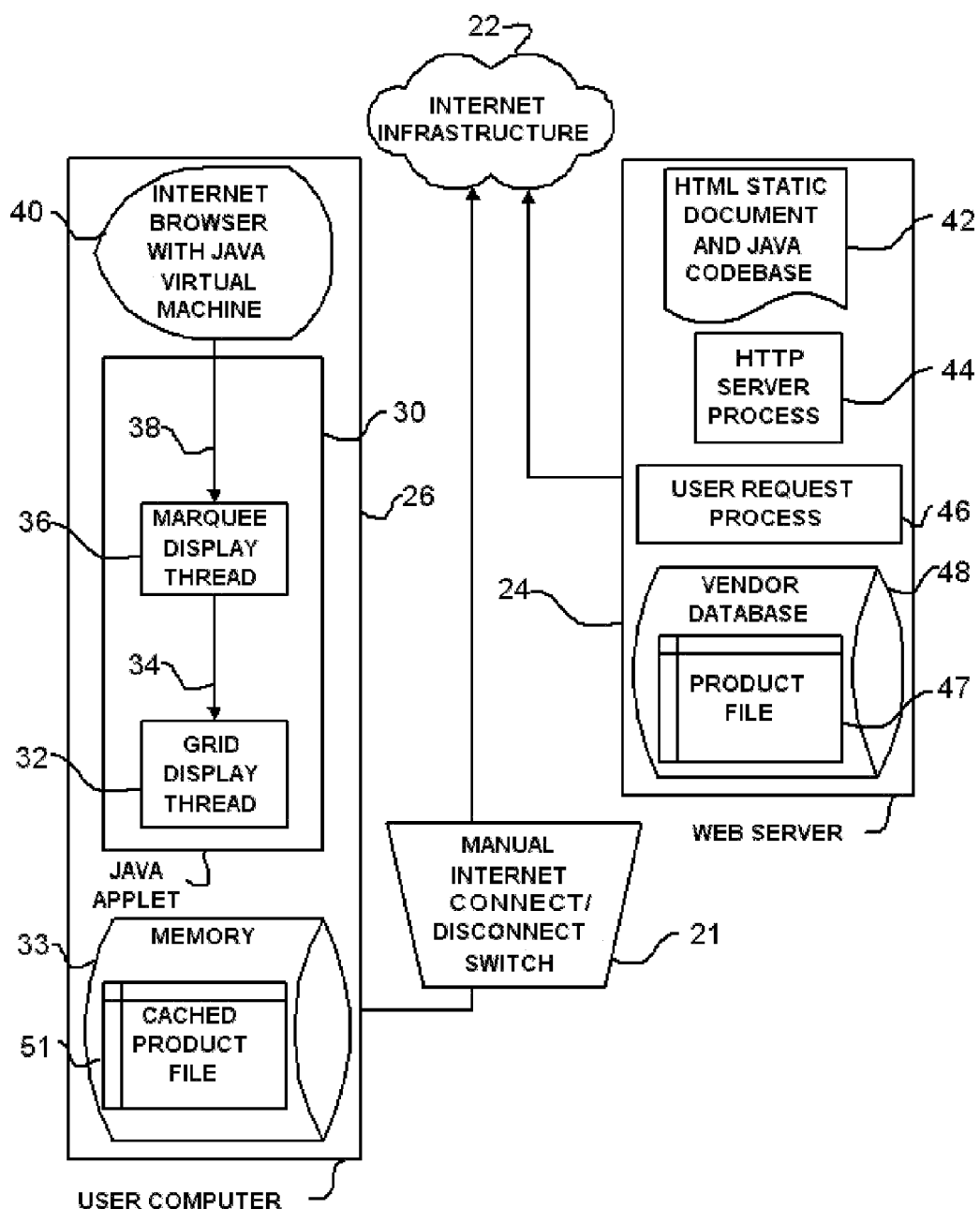
FIG. 3A is a schematic diagram illustrating the high level structure of a protocol for communication through the Internet Infrastructure between the user computer and the Web server.

FIG. 3A is a schematic diagram illustrating the high level structure of a protocol for communication between user computer 26 and Web server 24 communicating through Internet infrastructure 22 when the manual internet connect switch is in the "connect" position. The user computer contains browser 40 with Java applet 30. The applet could also be JavaScript, DHTML, ActiveX, VB script, or other similar methods. Note that the browser may not have to include Java when it is using pages of other technologies. For the purposes here, however, the description below is based on the use of the Java applet. Within the applet 30 are a marquee display thread 36 and a grid display thread 32. The marquee display thread interacts with the browser through cursor motion (symbolized by arrow labeled 38). The grid display thread interacts with the marquee display thread through a hotzone selection (symbolized by arrow labeled 34). The Web server 24 contains the HTML static document and Java codebase process 42, HTTP server process 44, user request process 46, and a plurality of common information files designated as product file 47, stored in vendor database 48. The format for information in the product file is shown in FIG. 2a and includes a grid display heading 80, column headings 79, and detail rows 71, all displayed in grid display 68, of FIG. 2A.

The preferred embodiment includes HTML forms, but they could also be Java applets, DHTML, JavaScript, ActiveX, VB script, or other methods. The server processes of the preferred embodiment may or may not be integrated with the main HTTP server process, they may use any number of threads of processing, they may be scripting or compiled code, they may run interactively with the server desktop or as a service or daemon. The server processes that need to be run may be distributed to other computational resources such as RMI or RPC or other methods. That is to say, computations that are needed do not have to be done in either a particular way nor by a particular machine. In this series of figures representing the preferred embodiment, the computation is decentralized, meaning that it is occurring in both user computer 26 and in web server 24. Computation could also be centralized, meaning that the web server does all of the computing.

Figure 3B:
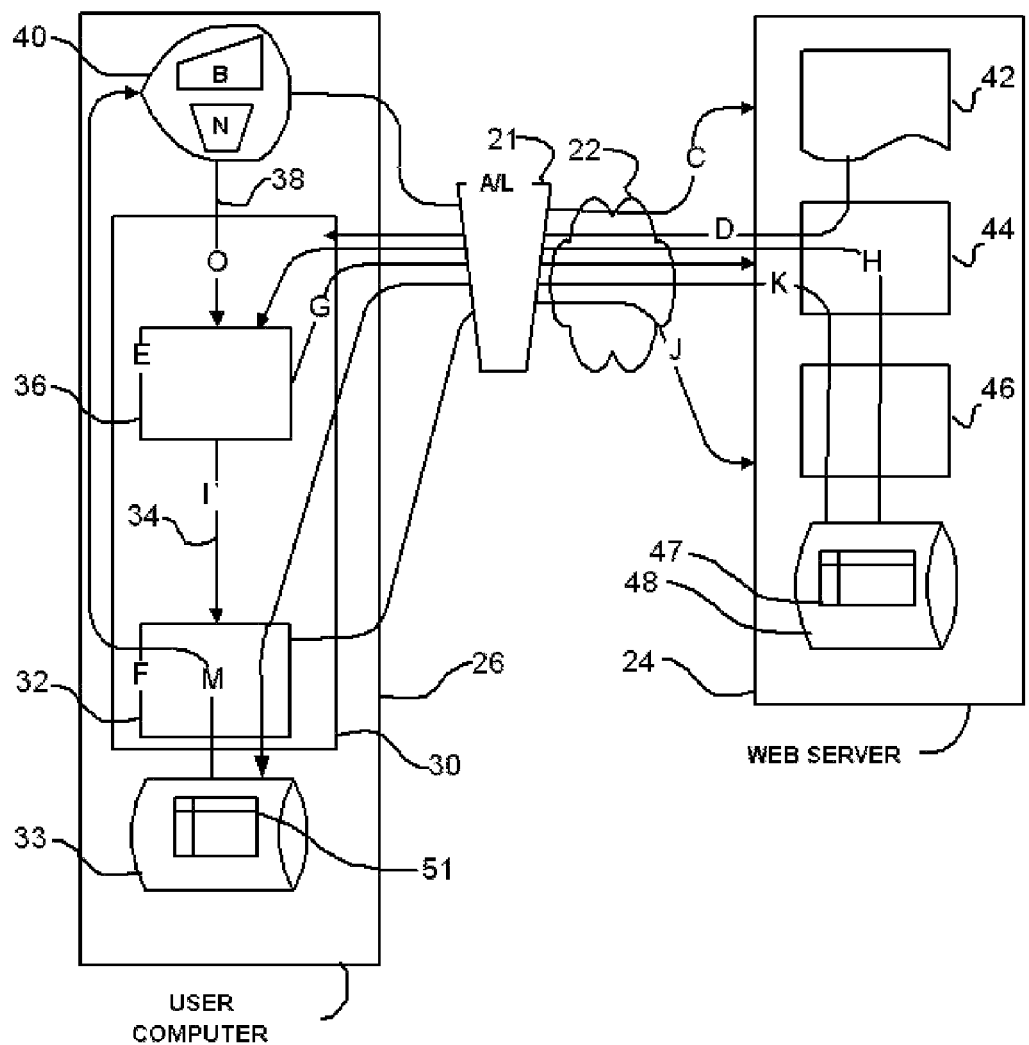
FIG. 3B is a schematic diagram illustrating the operational steps of the communication protocol in FIG. 3A.
Figure 3C:
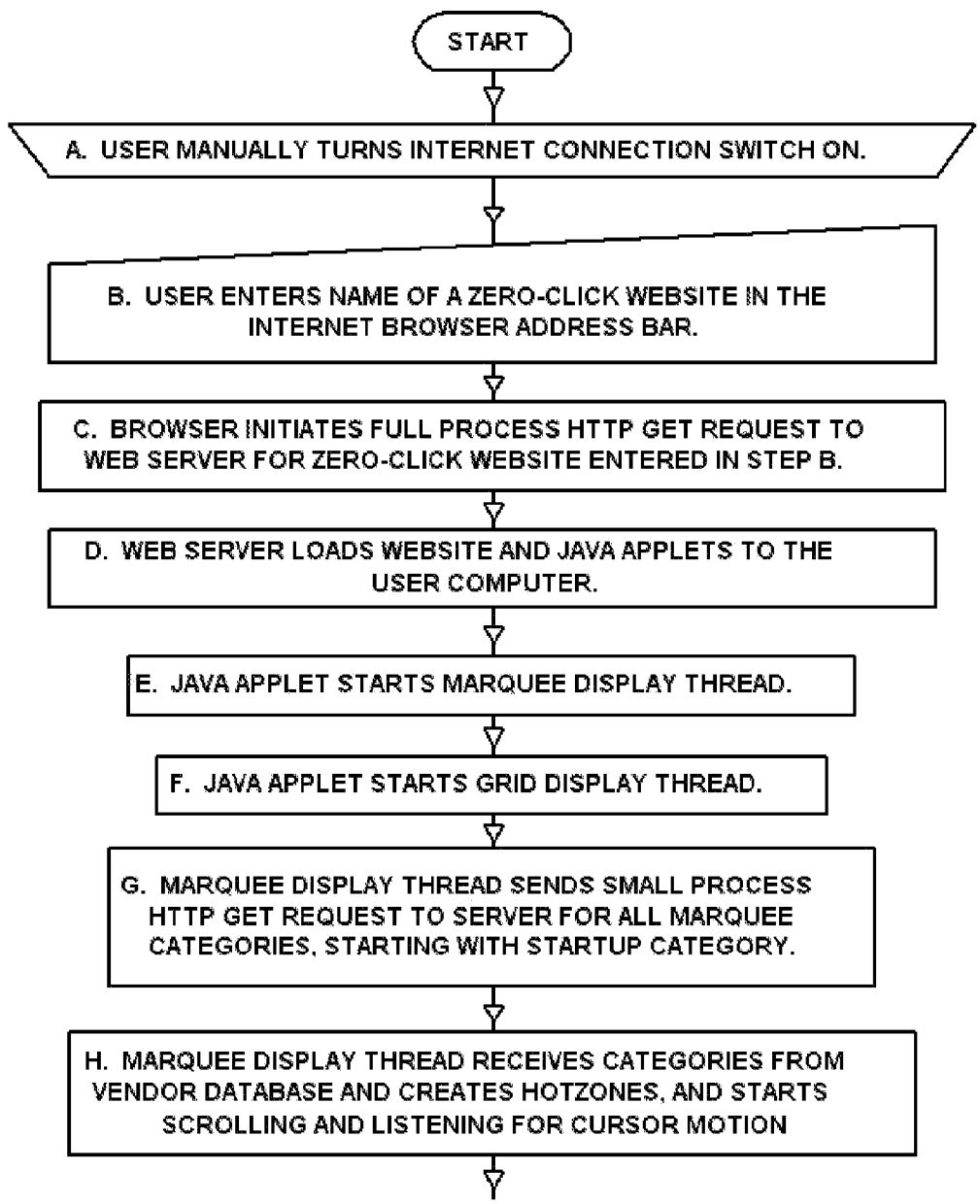
FIG. 3C is a high level flow chart explaining the operational steps involved in carrying out the communication protocol shown in FIG. 3B.
Figure 3D:
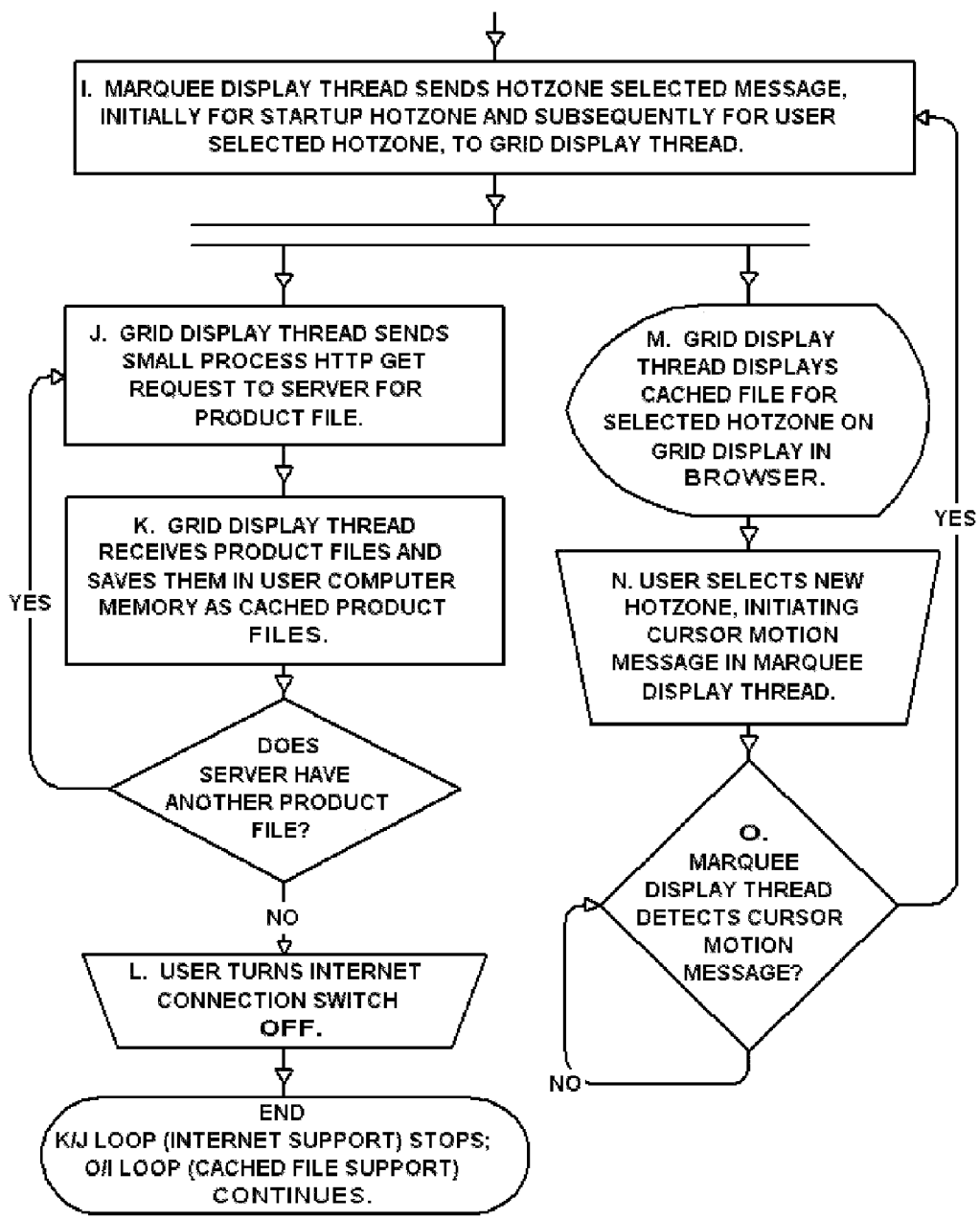
FIG. 3D is the continuation of FIG. 3C.

FIG. 3B is a flowchart of the process steps of the protocol shown in FIG. 3A. These steps are shown in FIGS. 3C and 3D and are described below. Note that in FIG. 3B, steps "A/L" and "N" show user physical inputs and step "B" shows user data entry.

FIGS. 3C and 3D are a standard flow chart that describes the process steps for the structure shown in FIG. 3A, as follows: in step A, a user at computer 26, in which Internet browser 40 is operating, manually turns switch 21 on to connect the computer to Internet 22. In step B, the user types the name of a zero-click website in the browser address bar, and presses the return key or by any other means enters the name in the browser address bar. In step C, the browser initiates the single Full Process HTTP GET Request required by the present process and sends the request to web server 24 for the zero-click website entered in step B. In step D, the web server loads the website and Java applet 30 from Java codebase 42 through server process 44 to the user computer browser. In step E, the Java applet starts marquee display thread 36. In step F, the Java applet starts grid display thread 32. In step G, marquee display thread 36 sends a small process HTTP GET request to the Web server for a list of marquee categories 82, starting with the startup category. In step H, marquee display thread 36 receives one of a multiplicity of marquee categories 82 from vendor database 48, through user request process 46 and server process 44, and creates hotzones 70, and marquee display thread 36 begins scrolling in the browser in the user computer and listening for cursor 84 motion. Referring now to FIG. 3D, in step I, the marquee display thread sends hotzone selected message 34, starting with the start-up hotzone, to grid display thread 32 to prepare to display introductory information explaining the use of the website. At this point the flow chart splits into two simultaneous paths to initiate process steps J and M simultaneously. In step J, grid display thread 32 sends a small process HTTP GET request to the Web server for the next product of each marquee category 82. In step K, the grid display thread receives the product files and saves them in user computer memory as cached product files 51. If there are no further contents in server product file 47, process control is moved to step L. In step L, the user can manually turn off switch 21 to disconnect the user computer from the Internet, thereby ending the single initial Full Process HTTP GET Request used for the download of all vendor database product information files available from the Web server to the user computer. At this point the K/J loop (Internet support) stops and the O/I loop (cached file support) continues for as long as there is utility to the user. Returning to the top of the chart, in step M (which is, as noted above, operates simultaneously with the left set of steps), grid display thread 32 displays in grid display 68 in browser 40 as much information as grid display thread 32 has received so far. This is information from cached product file 51 stored in user memory 33 that is related to the hotzone preselected in step I. In step N, the user selects a new hotzone by changing from one hotzone 70 to another hotzone 70 by causing some action of cursor 84 that indicates a marquee category 82. User action can be movement of a cursor, use of the tab key, a finger touching a pressure sensitive computer screen, or any other equivalent action on the user computer, initiating cursor motion message 38. In step O, the marquee display thread 36 waits to detect from the cursor motion message that the user has selected a new hotzone. If not, the "O" loop continues. If so, the process returns back to the top of the chart to step I. In step I, the marquee display thread sends cursor motion message 38, returning process control via grid display thread 32 to step M, which again displays in grid display 68 in browser 40 as much information as grid display thread 32 has received so far and stored as a cached product file 51 related to the newly selected hotzone in user memory 33. Thus, in the process loop on the left, a "yes" in the decision box after step K returns control to step J and, if there are product files that have not been downloaded yet, the left path K/J loop operates to download those files from the server and the user can at the same time use the right process loop to select a new hotzone and view existing cached files using the O/I loop. If there are no more files to be downloaded from the server, the user can manually turn off the Internet connection switch, ending the left path K/J loop, and continue to select new hotzones and view cached files using the right path O/I loop.

Figure 4A:
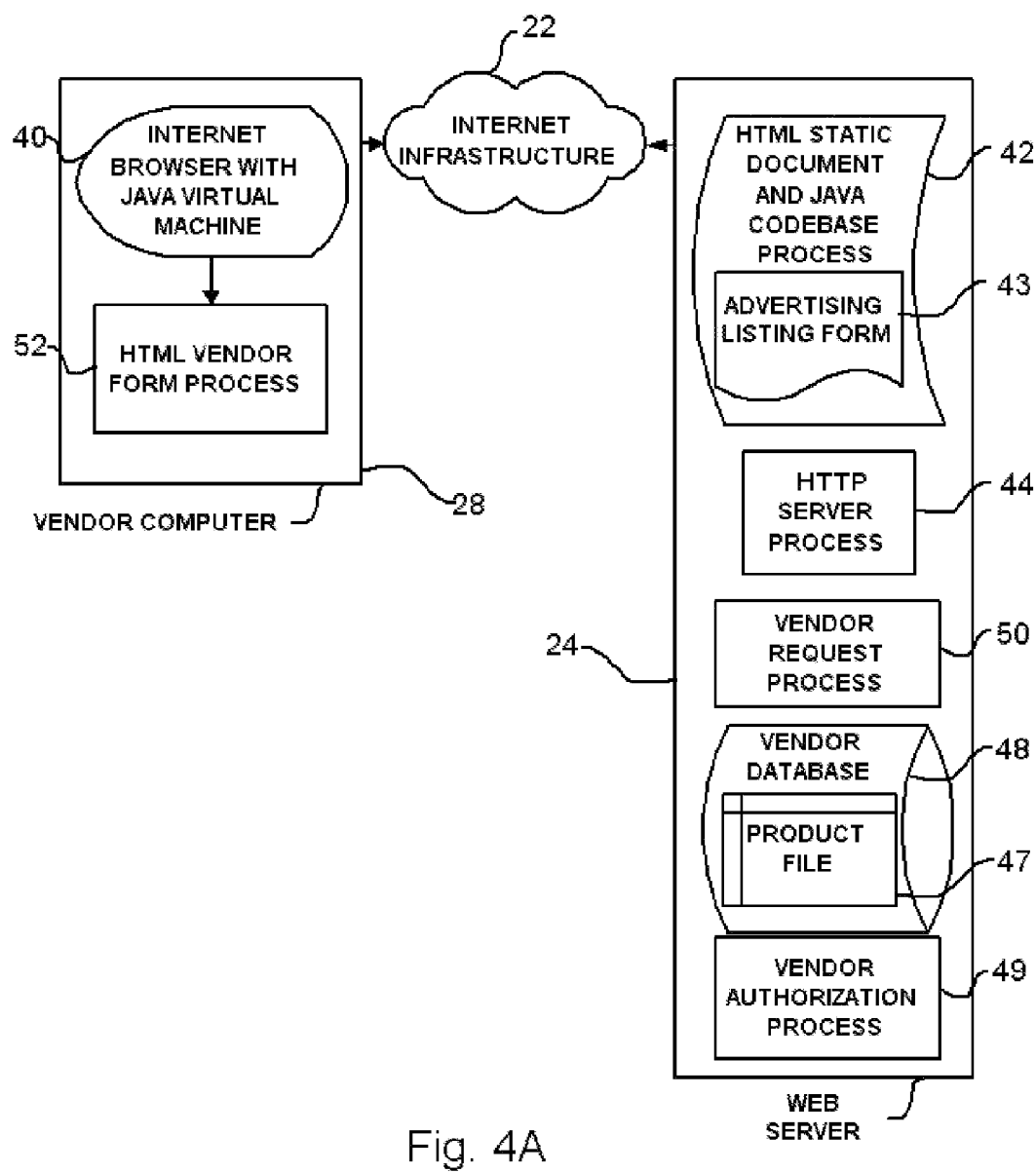
FIG. 4A is a schematic diagram illustrating the high level structure of a protocol for communication through the Internet between the vendor computer and the Web server.

FIG. 4A is a schematic diagram embodying the high level process steps of a protocol for communication between vendor computer 28 and Web server 24. The vendor computer and Web server communicate through Internet infrastructure 22. The vendor computer contains browser 40 and HTML vendor form process 52. The Web server contains Java codebase 42 including advertising listing form 43, HTTP server process 44, vendor request process 50, vendor database 48 with product file 47, and vendor authorization process 49.

Figure 4B:
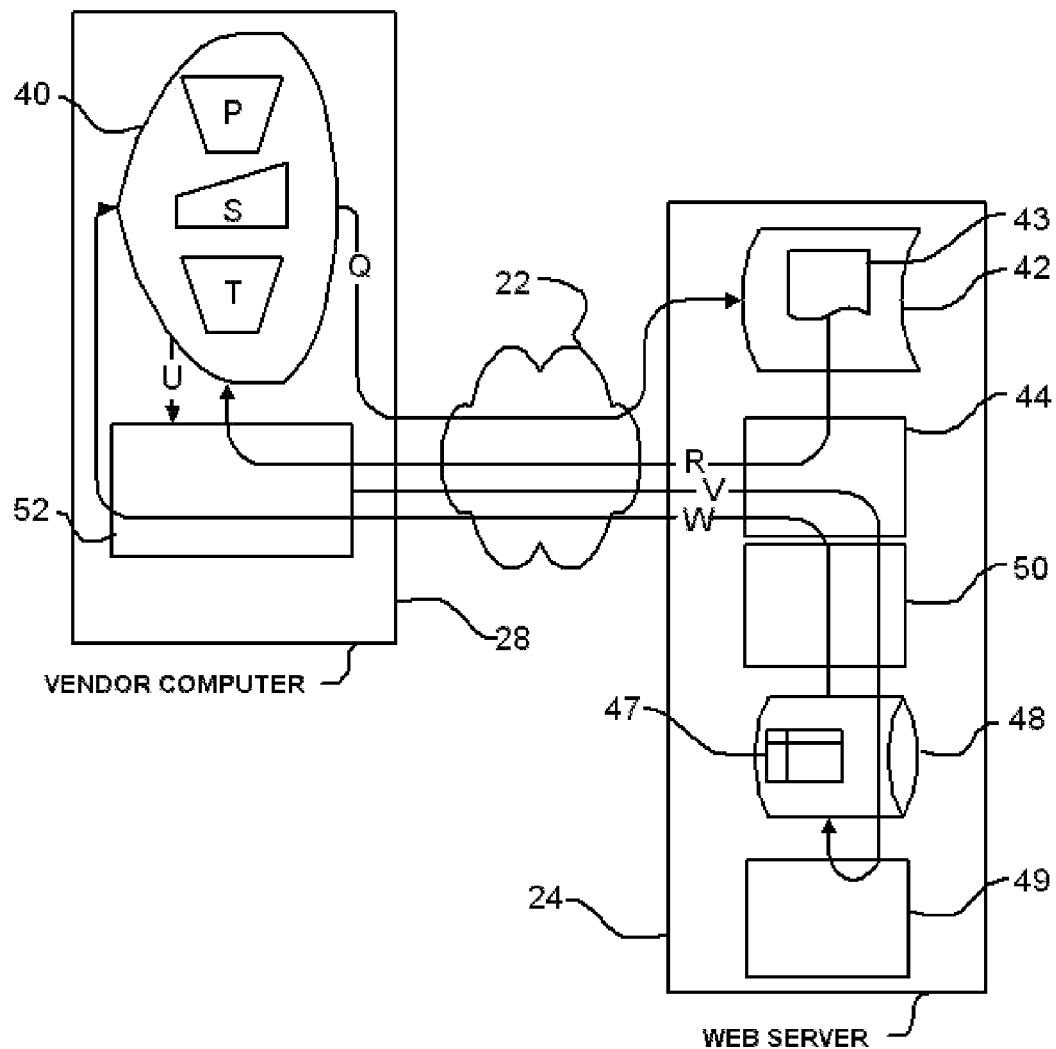
FIG. 4B is a schematic diagram illustrating the operational steps of the communication protocol in FIG. 4A.
Figure 4C:
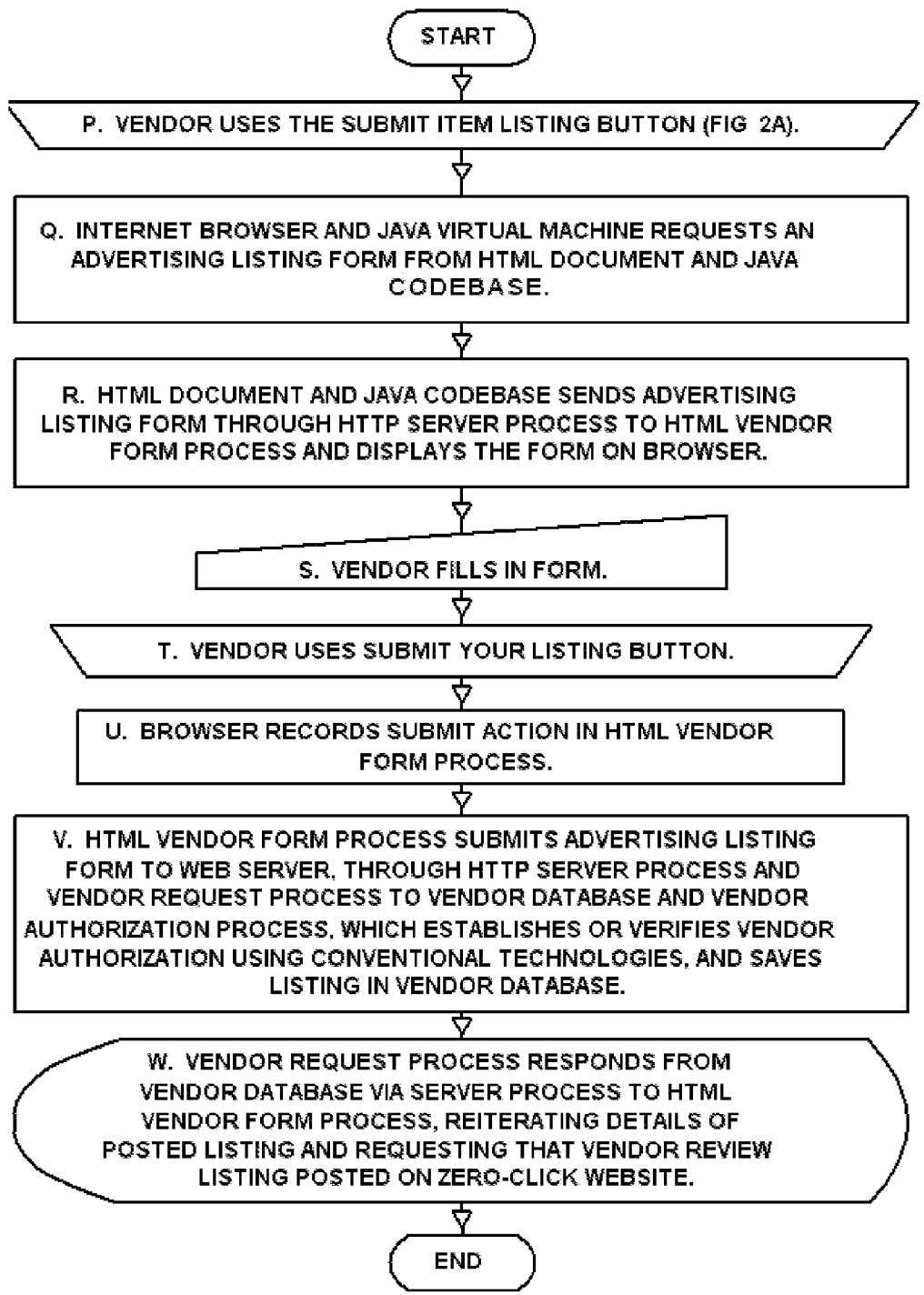
FIG. 4C is a high level flow chart explaining the operational steps involved in carrying out the communication protocol shown in FIG. 4B.

FIG. 4B is a standard flow chart and describes the process steps for the system of FIG. 4A. FIG. 4C lists the process steps of the protocol in FIG. 4A as described in FIG. 4B as follows. In step P, the vendor uses the "vendors: submit item listing" button 76 (FIG. 2A). In step Q, Internet browser and Java virtual machine 40 sends a request through server process 44 for advertising listing form 43 (FIG. 2D) stored in HTML static document and Java codebase process 42. In step R, HTML static document and Java codebase sends the advertising listing form through server process 44 to HTML vendor form process 52 and displays the form on vendor computer Internet browser 40. In step S, the vendor fills in the form. In step T, the vendor uses the "submit your listing" button 78 on the form [FIG. 2D]. In step U, vendor browser 40 records the submit action in HTML vendor form process 52. In step V, the HTML vendor form process submits the completed advertising listing form to the Web server through server process 44 and vendor request process 50 to vendor database 48 and vendor authorization process 49, which establishes or verifies vendor authorization using conventional technologies, and saves the listing in product file 47 in vendor database 48. In step W, vendor request process 50 responds from vendor database 48 via server process 44 to vendor form process 52, reiterating details of the posted listing and requesting that the vendor review the posted listing.

Figure 5A:
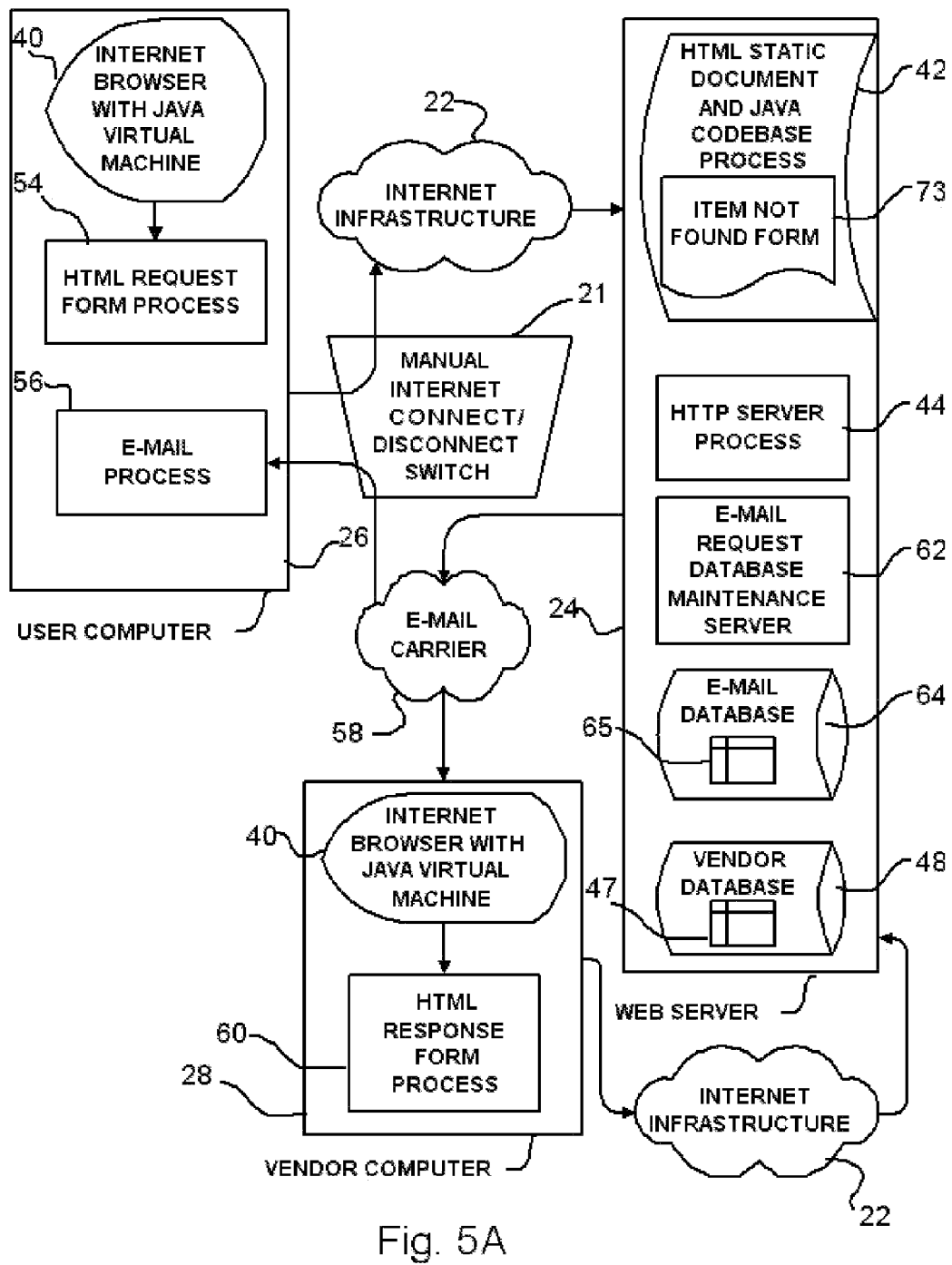
FIG. 5A is a schematic diagram illustrating the high level structure of a protocol for communication between the user computer and the vendor computer, with the Web server as intermediary.

FIG. 5A is a schematic diagram embodying the high level process steps of a protocol for communication between vendor computer 28 and Web server 24, and between user computer 26 and the Web server. The user computer contains Internet browser with Java virtual machine 40, HTML request form process 54, and e-mail process 56. The Web server contains HTML static document and Java codebase process 42 including "item not found" form 73, HTTP server process 44, e-mail request database maintenance server 62, e-mail database 64 including e-mail file 65, and vendor database 48 including a multiplicity of product files 47. The vendor computer contains browser 40, and HTML response form process 60. In the preferred embodiment there is a vendor database, although information may be stored under the control of some other software or may be stored as plain text files in the native operating system format. The user computer and the Web server communicate through Internet infrastructure 22 and e-mail carrier 58. The vendor computer and the Web server communicate through both Internet infrastructure 22 and e-mail carrier 58.

Figure 5B:
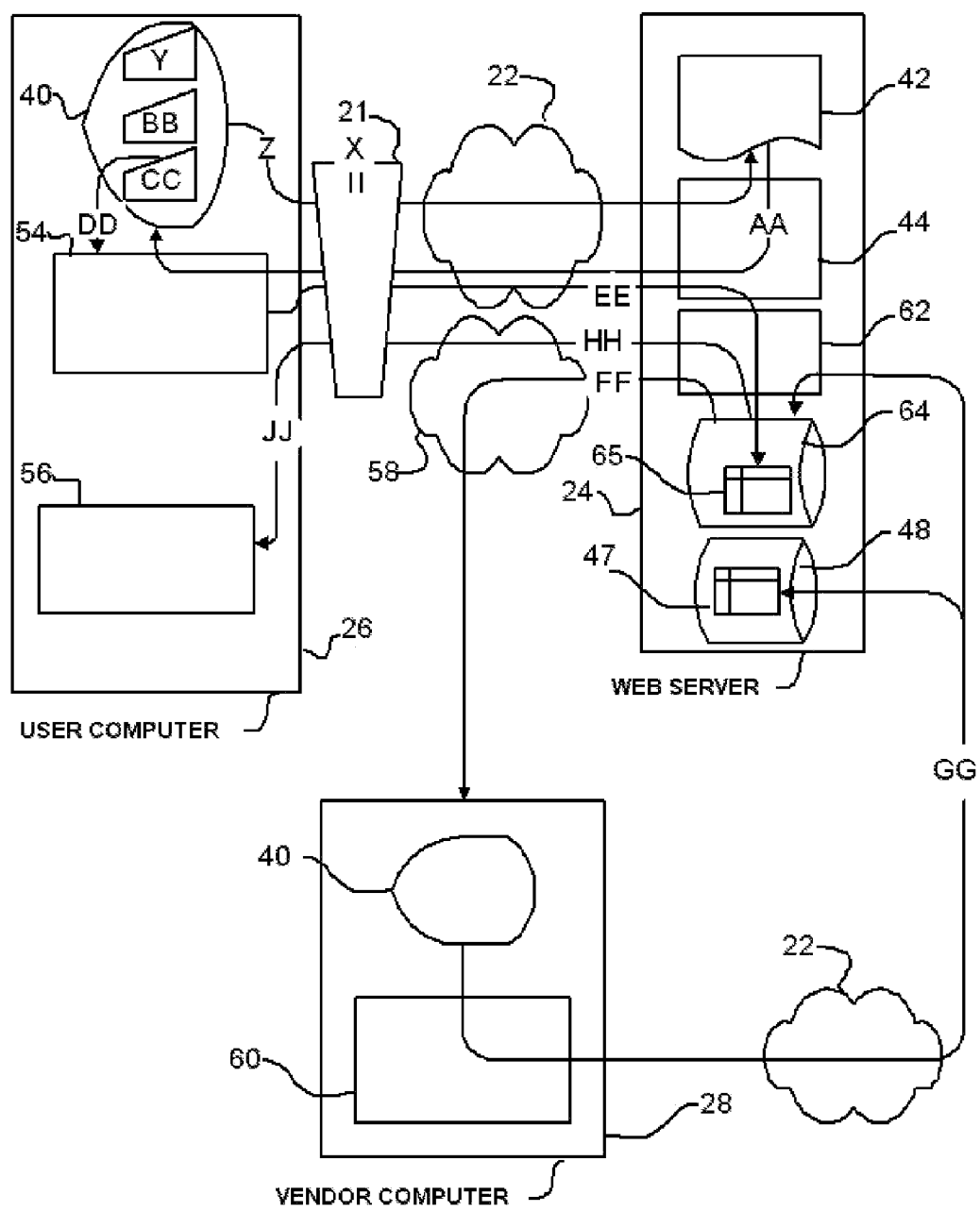
FIG. 5B is a schematic diagram illustrating the operational steps of the communication protocol in FIG. 5A.
Figure 5C:
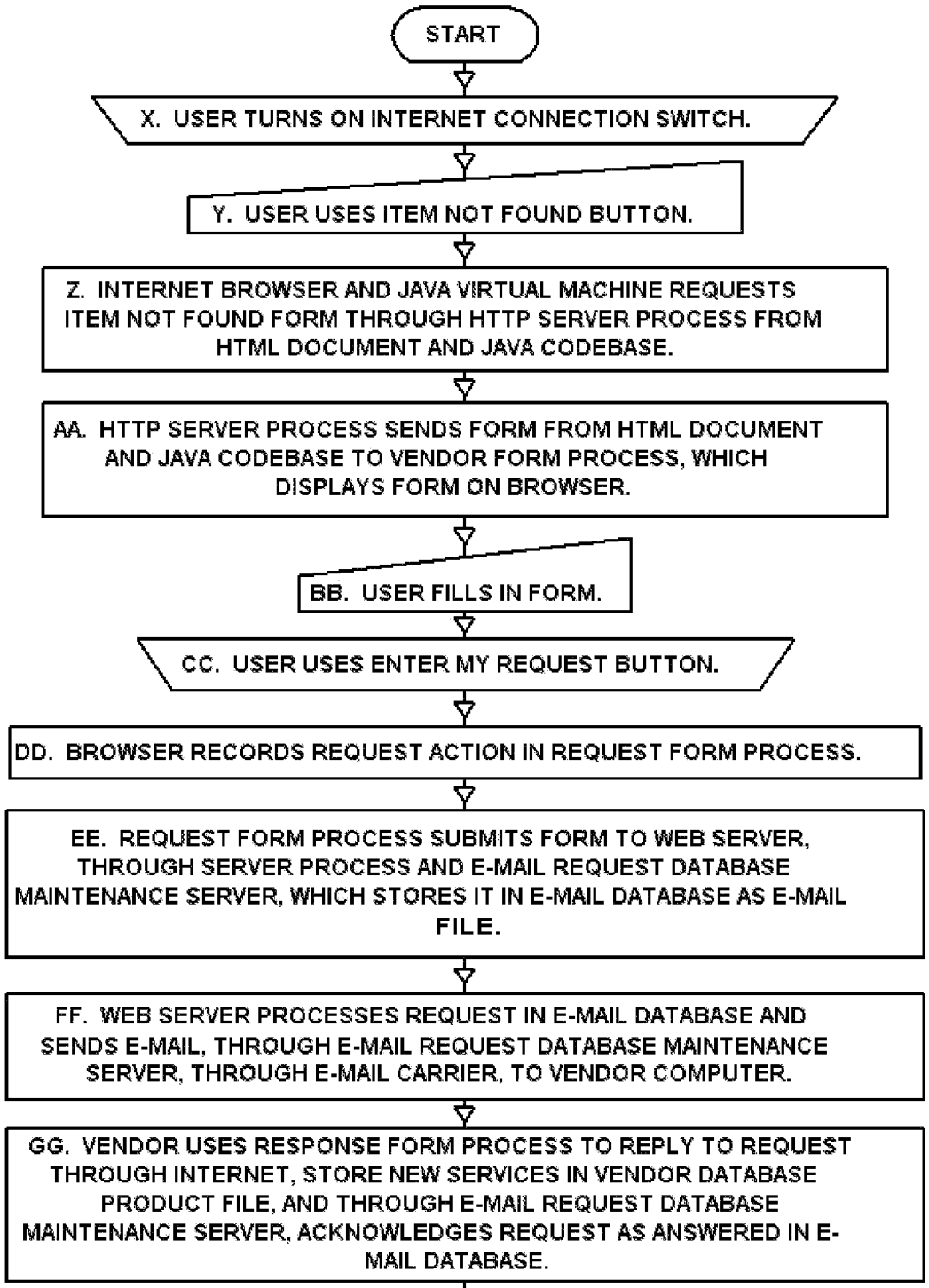
FIG. 5C is a high level flow chart illustrating the steps involved in carrying out the communication protocol shown in FIG. 5B.
Figure 5D:
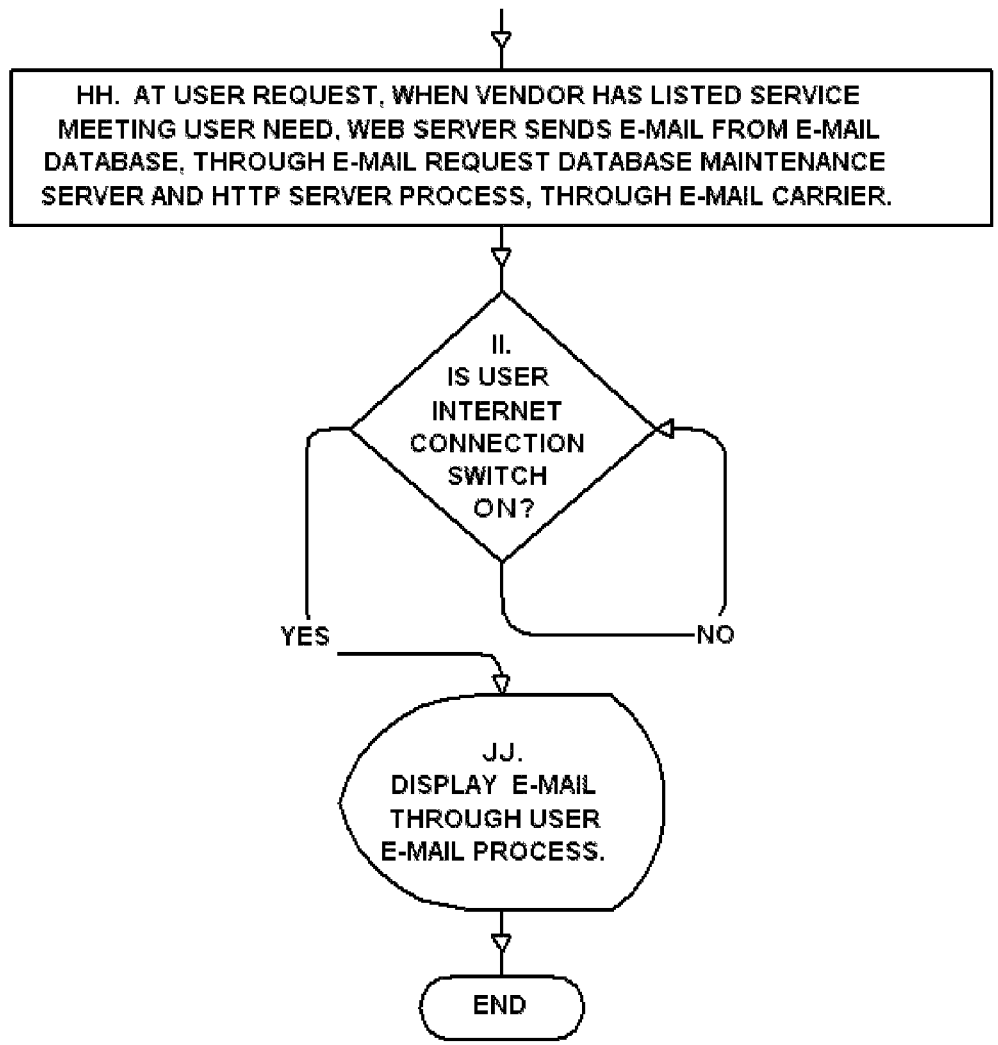
FIG. 5D is the continuation of FIG. 5.

FIG. 5B is a standard flow chart and describes the process steps for the system of FIG. 5A. FIG. 5C lists the process steps of the protocol in FIG. 5A as described in FIG. 5B as follows. In step X, the user manually turns on Internet connection switch 21. In step Y, the user uses request for item not found button 72 (FIG. 2A). In step Z, Internet browser and Java virtual machine 40 requests "item not found" form 73 through HTTP server process 44 from HTML static document and Java codebase 42. In step AA, HTTP server process 44 sends item request form 73 from HTML static document and Java codebase 42 through HTML request form process 54, which displays the form on user browser 40. In step BB, the user fills in request form 73 (FIG. 2D). In step CC, the user uses enter my request button 74. In step DD, the browser records the request action in HTML request form process 54. In step EE, HTML request form process 54 submits the form through HTTP server process 44 and e-mail request database maintenance server 62, which stores it in e-mail database 64 as e-mail file 65. In step FF, Web server 24 processes the request in e-mail database 64 and sends e-mail, through e-mail request database maintenance server 62, through e-mail carrier 58, to vendor computer 28. In step GG, the vendor uses Internet browser with Java virtual machine 40 and HTML response form process 60 to reply to the request, through Internet infrastructure 22, stores new services in vendor database 48 in product file 47, and acknowledges the request as answered, through e-mail request database maintenance server 62, in e-mail database 64. Referring now to FIG. 5D, in step HH, at user request, when a vendor has listed a service meeting the user need, Web server 24 sends an e-mail from e-mail database 64, through e-mail request database maintenance server 62 and HTTP server process 44, through e-mail carrier 58. In step II, the e-mail waits until the user has turned on Internet connection switch 21. In step JJ, the e-mail is received by e-mail process 56, which displays the e-mail through the user computer Internet browser 40.

The system and method of displaying electronic database reports on the Internet is useful to advertisers. It provides a fundamental information resource and timesaving to users viewing the advertisements. This system allows a vendor's customers to save time displaying database files offered on a website by avoiding the wait for successive latency periods after the initial and only Full Process HTTP GET Request is completed. It allows vendors to list items and simplifies navigation by presenting all information on the home page of a website. It provides a request for information not found, including a method of listing products and services not available on the Internet. It allows vendors an easy way to advertise. It provides comparative advertising. It gives vendors sufficient space to differentiate themselves in their vertical market, allowing their customers to view enough information to make a purchasing decision.

An example of a use for this system is that of converting the current hard copy of all yellow pages business telephone directories to electronic data on the Internet, though in a more interactive manner using the instant invention than its paper counterpart. The instant invention lists all of the products and services of those vendors, and enables the user to view any product or service in a comparison format. A second example of a use for this system is that of putting the catalogues of all business vendors for a company or government entity on an intranet or local area network, and enabling representatives of that entity to view any products or services available to that entity in a comparison or non-comparison format, thus facilitating company or government entity procurement. A third example of a use for this system is that of a mechanism to organize and display hierarchical information in a non-comparative or comparative listing, such as of phone numbers of different categories of business or government entity contacts.

Another example of this method is the case of a typical Web search that produces a list of relevant website links. When mousing over the links, a representation of each website is shown. The represented website is not, however, downloaded. To download it, the user must click on the link and then wait for the website information to download in real time. Applying the instant invention to this process, the information on each website can be downloaded in the background while the user is looking at the listings and beginning to look at information on the first website as it is moused over. When the user mouses over additional links, the information on each website is presented in the grid display immediately, saving real time.

In another embodiment, the ability to move over embedded layers (drilling down through files) is shown. This method allows the user to move from general information categories through successively more specific categories, and finally to the information of interest. The method uses the central concept of the zero-click method, using threads rather than full processes, to anticipate the user's line of inquiry by downloading in the background, or preloading, the set of categories that is two steps ahead of the category selected. For example, when the startup (first) level marquee categories are automatically selected and appear, the second level categories are preloaded. When the user then selects a first level marquee category, the preloaded set of second marquee categories corresponding to the category selected is displayed and all possible third level marquee categories, two steps ahead of the category selected, are preloaded. Preloaded categories are not yet displayed, but are stored in user memory so that they are available to immediately display when the category representing them is selected. When a second level marquee category is then selected, the third marquee categories so selected are shown in the third level marquee and all possible fourth level marquee categories are preloaded. In this way the method allows the user to selectively download only those files of interest to the terminal marquee, saving time compared to downloading all of the terminal information files in the database.

Figure 6A:
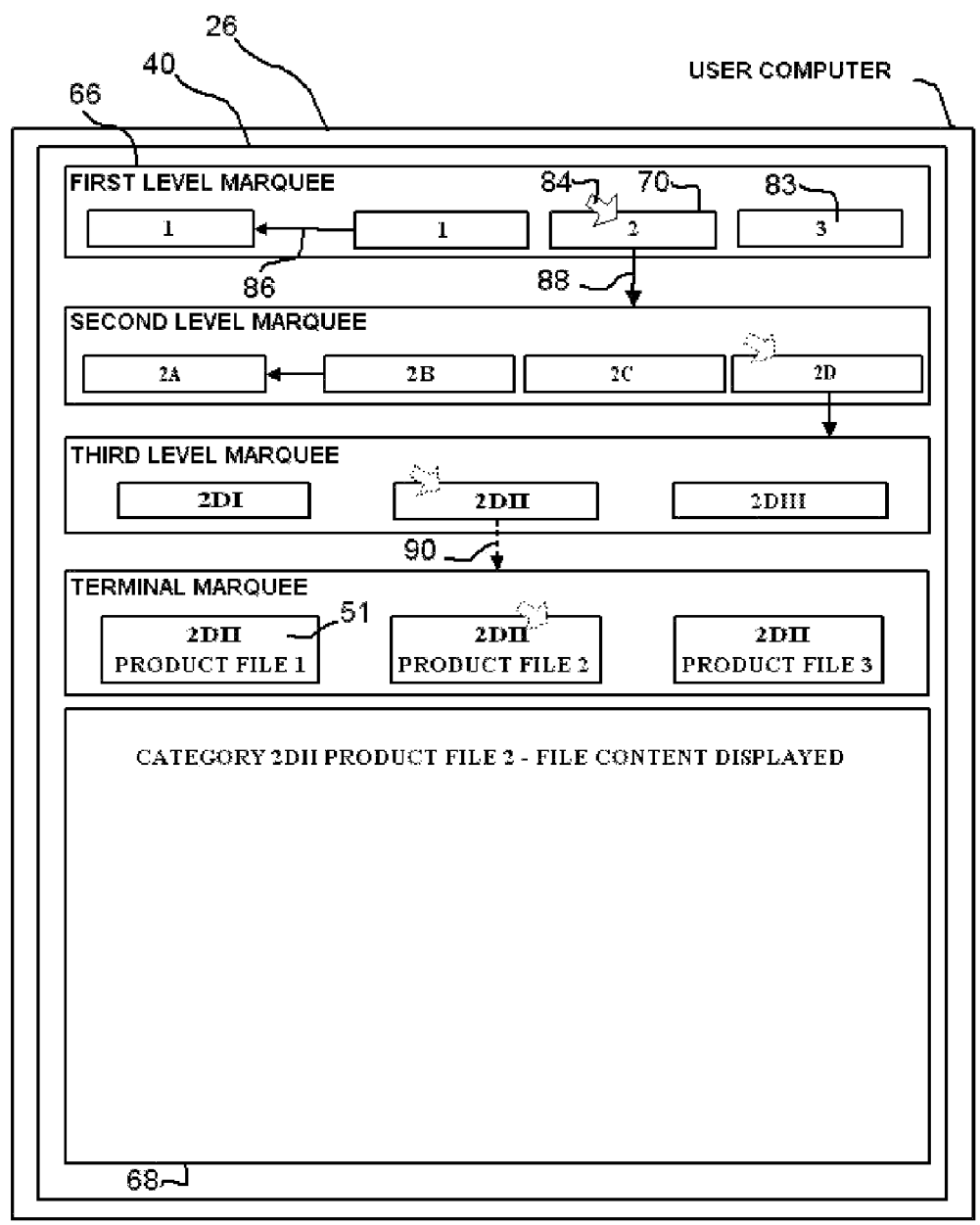
FIG. 6A is a schematic representation of another special case of the conventional website presented in FIG. 2A.

FIG. 6A is a schematic representation of user computer 26 where the process steps are initiated and where resultant file contents are displayed. This computer has an Internet browser with Java virtual machine 40, a marquee display 66, and a grid display 68. The marquee display is represented variously as first, second, third, etc., and terminal levels. On the first level marquee display are three of a plurality of hotzones 70, and, within each of the hotzones, is cached marquee category 83, which can also be called a "phrase". (Cached marquee category 83 is required in this special case rather than the marquee category 82 used in the general case due to the need to preload marquee categories.) The hotzone may consist of, but is not limited to, text, raster graphics, or buttons, which are common iconic visual representations of user interface controls. There is a motion arrow 86, pointing from marquee category 1 in one hotzone to another hotzone, also named marquee category 1. This arrow represents movement. The movement may be in any direction or manner, such as bouncing, or it may be holding still if there are few enough categories to be displayed without motion. The preferred movement is scrolling of the hotzones and their attendant marquee categories from right to left. In addition, pointing to one of the categories in one of the hotzones is user cursor 84. The cursor, or mouse cursor, is a feedback tool that tells a user where he or she is on the website. User feedback tools may consist of, but are not limited to, cursors, arrows, or pens, but are herein called cursors.

Because the cursor in the first level marquee is pointing to the category "2", there is a drill-down arrow 88 indicating that the second level marquee is presenting marquee categories associated with category "2", such that each category in the second marquee is prefaced with the number "2", as in 2A, 2B, 2C, and 2D.

Similarly, the cursor in the second level marquee is indicating category "2D", causing the third level marquee to present "2D" categories I, II, and III.

The cursor in the third level marquee, indicating category 2DII, is shown with a dotted terminal drill-down arrow 90, leading to the terminal marquee. This dotted arrow indicates that there can be a multiplicity of marquee levels between the first level marquee and the terminal marquee.

The terminal marquee has categories representing a multiplicity of files, the contents of which can be presented in the grid display when the cursor indicates a category. The file contents of category 2DII Product File 2 are so indicated and therefore shown as presented in the grid display. These can be any file contents, such as photographs, writings, charts, or other representations.

Figure 6B:
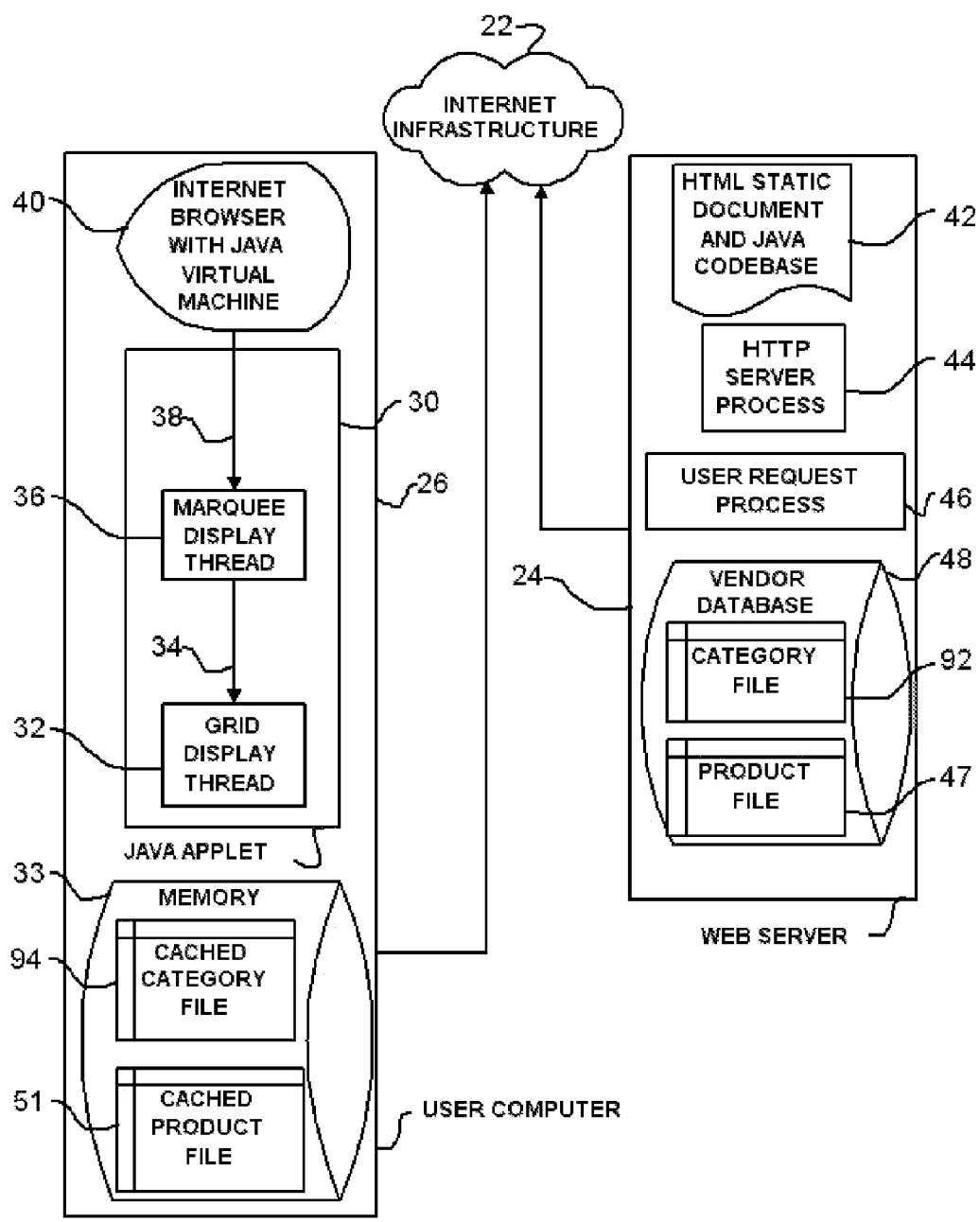
FIG. 6B is a schematic diagram illustrating the high level structure of a protocol for communication through the Internet Infrastructure between the user computer and the Web server.

FIG. 6B is a schematic diagram illustrating the high level structure of a protocol for communication between user computer 26 and Web server 24 communicating through Internet infrastructure 22. The user computer contains browser 40 with Java applet 30. The applet could also be JavaScript, DHTML, ActiveX, VB script, HTML5, or other similar methods. Note that the browser may not have to include Java when it is using pages of other technologies. For the purposes here, however, the description below is based on the use of the Java applet. Within the applet 30 are a marquee display thread 36 and a grid display thread 32. The marquee display thread interacts with the browser through cursor motion (symbolized by arrow labeled 38). When the selected hotzone is in the terminal marquee, the grid display thread interacts with the marquee display thread through hotzone selection (symbolized by arrow labeled 34). Also included in the user computer is memory 33, including cached product file 51 and cached category file 94. The Web server 24 contains the HTML static document and Java codebase process 42, HTTP server process 44, user request process 46, and both a plurality of common information files designated as product file 47 and a plurality of category files 92, stored in vendor database 48. The information in the product file is open (any) format as shown in FIG. 6A and can be photographs, writing, charts, or any other information and is all displayed in grid display 68.

The server processes of the preferred embodiment may or may not be integrated with the main HTTP server process, they may use any number of threads of processing, they may be scripting or compiled code, they may run interactively with the server desktop or as a service or daemon. The server processes that need to be run may be distributed to other computational resources such as computer servers using techniques such as RMI or RPC or other methods. That is to say, computations that are needed do not have to be done in either a particular way nor by a particular machine.

Figure 6C:
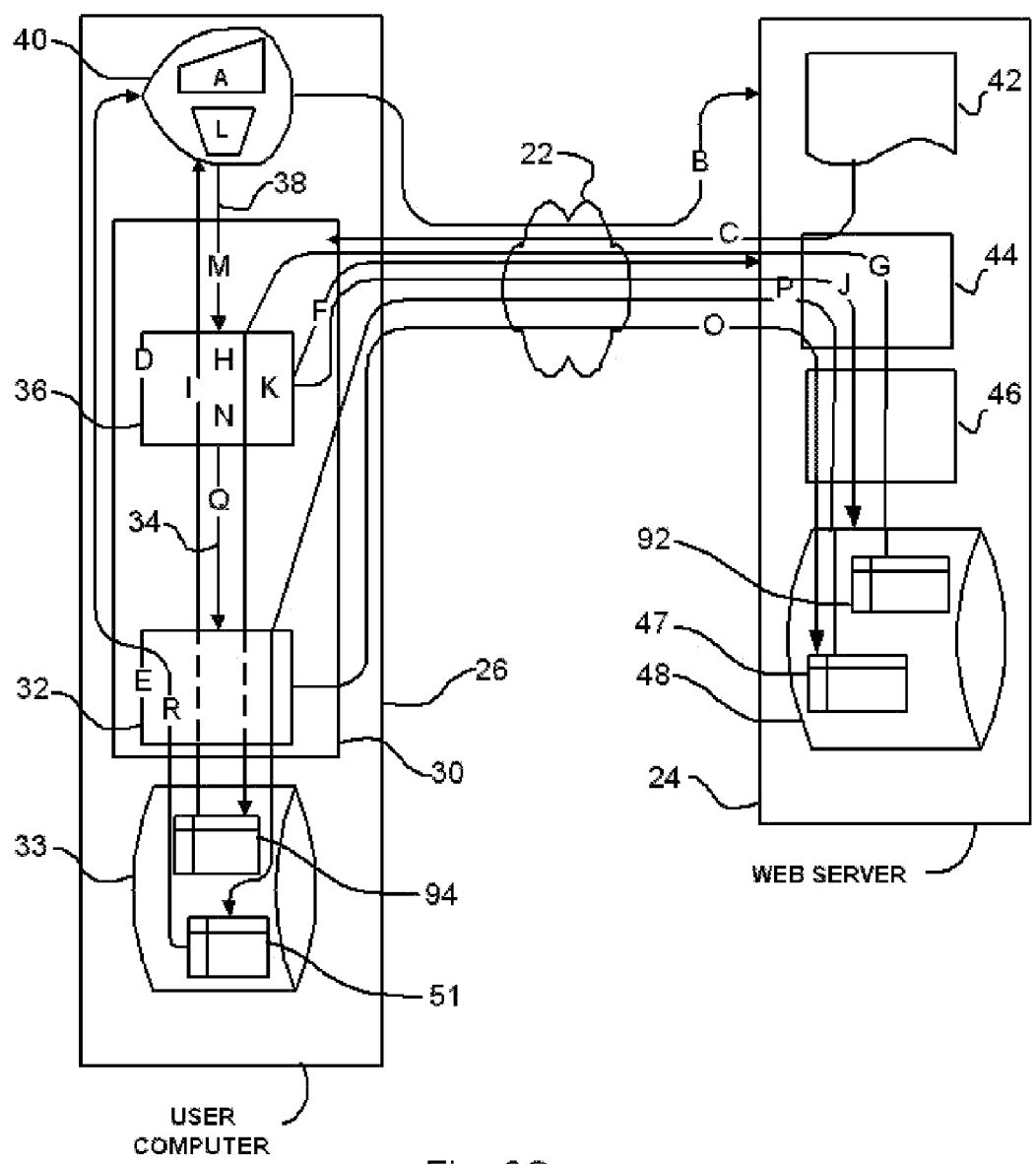
FIG. 6C is a schematic diagram illustrating the operational steps of the communication protocol in FIG. 6B.
Figure 6D:
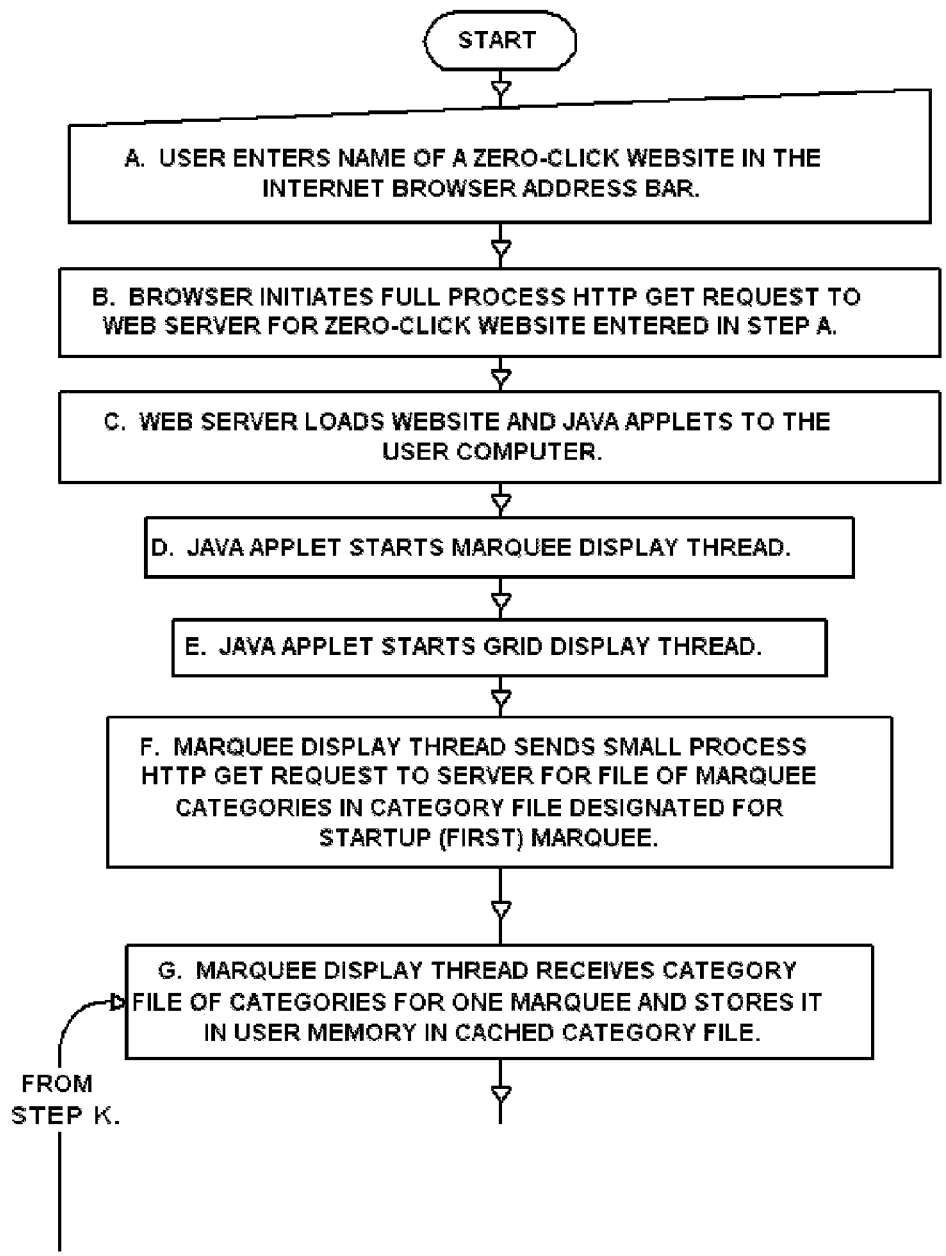
FIG. 6D is a high level flow chart explaining the operational steps involved in carrying out the communication protocol shown in FIG. 6C.
Figure 6E:
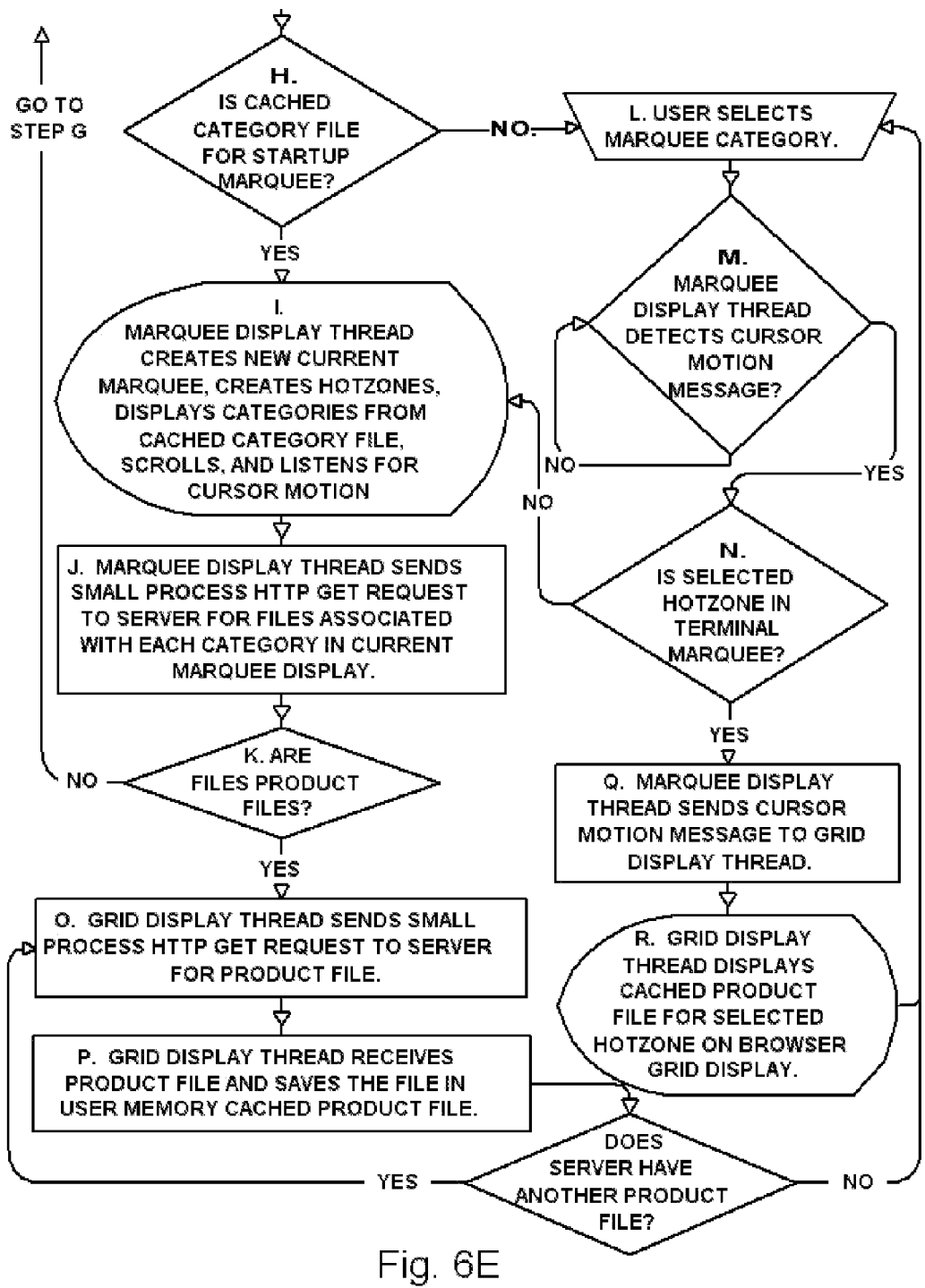
FIG. 6E is the continuation of FIG. 6D.

FIG. 6C illustrates the process steps of the protocol shown in FIG. 6B. These steps are shown in FIGS. 6D and 6E and are described below. Note that in FIG. 6C, step "A" shows user data entry and step "L" shows user physical input.

FIG. 6D is a standard flow chart that is continued in FIG. 6E and describes the process steps shown in FIG. 6C. The method is here described in three overlapping sequences.

The first sequence creates the startup (first) marquee as follows: in step A, a user at computer 26, in which Internet browser 40 is operating, types or by any other means enters the name of a zero-click website in the browser address bar, and presses the return key. In step B, the browser initiates the single Full Process HTTP GET Request required by the instant invention and sends the request to web server 24 for the zero-click website entered in step A. In step C, the web server loads the website and Java applet 30 from Java codebase 42 through server process 44 to the user computer browser. In step D, the Java applet starts marquee display thread 36. In step E, the Java applet starts grid display thread 32. In step F, marquee display thread 36 sends a small process HTTP GET request to the Web server for a file of all marquee categories 82 designated for the startup (first) marquee. In step G, marquee display thread 36 receives a multiplicity of marquee categories 82 designated for one marquee from category file 92 in vendor database 48, through user request process 46 and server process 44 and stores them as cached marquee categories 83 in cached category file 94. In step H, the marquee display thread determines if the cached category file is for the startup marquee. If the cached category file is for the startup marquee, control is transferred to step I, in which the marquee display thread creates a new current marquee, creates hotzones 70 in that marquee, displays the categories from the cached marquee file, and marquee display thread 36 begins scrolling in the browser in the user computer and listening for cursor 84 motion.

The second sequence creates all marquees subsequent to the start-up marquee, that is, the second through terminal marquees, as follows: in step J, the marquee display thread sends a small process HTTP GET request to the server for files associated with each of the categories in the current marquee display. In step K, the marquee display thread determines if the files are product files. When they are not product files, control is returned to step G to receive the new category files for one marquee and store them in user memory in the cached category file. In step H, when the marquee display thread determines that the cached category file is not for the startup marquee, control is passed to step L. In step L, the user selects a marquee hotzone 70 by causing some action of cursor 84 that indicates a marquee category 82. User action can be movement of a cursor, use of the tab key, a finger touching a pressure sensitive computer or mobile solutions (i.e., smart phone) screen, or any other equivalent action on the user computer, initiating cursor motion message 38. The following steps are an iterative process. At the first iteration of step L, the user selects a category in the startup marquee and then control passes to step M. As noted below, unless the category is in the terminal marquee, the routine cycles through as many times as is necessary to load the files. Following the sequence below, when control is once again passed from step H, at the second iteration of step L, the user selects a category in the second marquee and then control passes to step M, et seq. At the next iteration, a category is selected in the in the third marquee, etc., until the terminal marquee is reached. Once a category is selected in step L, control passed to step M, where the marquee display thread looks for a cursor motion of some type. If it does not detect cursor motion message 38 it waits. When the marquee display thread does detect the cursor motion message control is passed on to step N. In step N, the marquee display thread determines if the selected hotzone is in the terminal marquee. If the selected hotzone is not in the terminal marquee, control is passed on to step I. In step I, the marquee display thread creates a new current marquee, creates hotzones 70 in that marquee, displays the categories from the cached marquee file, and marquee display thread 36 begins scrolling in the browser in the user computer and listening for cursor 84 motion. As noted, these steps are repeated until the terminal marquee is reached.

The third and final sequence creates the terminal marquee and grid display 68 (the terminal marquee is distinguishable from the other marquees only in that the categories in it represent product files) as follows: in step J, the marquee display thread sends a small process HTTP GET request to the server for files associated with each category in the current marquee display. In step K, if the files are product files, control is passed to step O. In step O, grid display thread 32 sends a small process HTTP GET request to the server for product file 47 in the vendor database 48. In step P, the grid display thread receives the product file and saves it in user memory as cached product file 51. If the server has additional product files associated with the current marquee display, control is returned to step O to request them. If there are no further product files, control moves to step L. In step L, the user selects a category in the final marquee. In step M, the marquee display thread detects a cursor motion message. In step N, the marquee display thread recognizes that the file associated with the selected category in the terminal marquee is a product, and process control moves to step Q. In step Q, the marquee display thread sends a cursor motion message to grid display thread 32. In step R, the grid display thread displays the cached product file for the selected hotzone on grid display 68. Control is then returned to step L, where the user can select either another terminal display category in the same terminal marquee, or a category in any of the higher level marquees to start the drill-down process of selecting a category in a new terminal marquee and displaying its product file.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A method of displaying a plurality of electronic files with a minimum of latency periods, on a client computer containing a browser comprising the steps of:
   a) connecting the client computer to a web server through the Internet via selection of a switch displayed on a display screen of the client computer;
   b) displaying a web page;
   c) having said web server display a marquee display thread having a plurality of hotzones on the client computer;
   d) creating a grid display, having a storage file, for each of said plurality of hotzones;
   e) downloading a plurality of information files relating to said plurality of hotzones from said web server, one of said plurality of information files relating to one of said plurality of hotzones;
   f) storing said plurality of information files in a means for storing information files, housed on said client computer;
   g) installing one of said plurality of information files, relating to one of said plurality of hotzones, into the grid display storage file relating to said one of said plurality of hotzones;
   h) repeating step g for each of said plurality of hotzones in said marquee display;
   i) disconnecting said client computer from said web server via another selection of the switch, leaving an operating simulation of the web page on the client computer;
   after disconnecting said client computer from said web server:
   j) selecting a one of said plurality of hotzones;
   k) accessing one of said plurality of information files stored on said client computer related to the one of said plurality of hotzones selected in step j, from said means for storing information files on said client computer;
   l) displaying said grid display for said one of said plurality of hotzones; and
   m) reading said one of said plurality of information files related to said one of said plurality of hotzones.

2. The method of claim 1 further comprising the steps of:
   a) after step m, selecting a second of said plurality of hotzones;
   b) accessing a second of said plurality of information files, stored on said client computer, related to said second of said plurality of hotzones from said means for storing information files on said client computer;
   c) displaying said grid display for said second of said plurality of hotzones; and
   d) reading the said second of said plurality of information files related to said second of said plurality of hotzones.

3. The method of claim 2 further comprising the steps of:
   a) after step d, selecting a third of said plurality of hotzones;
   b) accessing a third of said plurality of information files, stored on said client computer, related to said third of said plurality of hotzones from said means for storing information files on said client computer;
   c) displaying said grid display for said third of said plurality of hotzones; and
   d) reading said third of said plurality of information files related to said third of said plurality of hotzones.

4. The method of claim 3 further comprising the steps of:
   a) after step d, deleting said plurality of information files, stored on said client computer from said means for storing information files;
   b) connecting the client computer to a web server through the Internet;
   c) displaying a web page;
   d) having said web server display a second marquee display thread having a plurality of hotzones on the client computer;
   e) creating a grid display for each of said plurality of hotzones in said second marquee display;
   f) downloading a plurality of information files relating to said plurality of hotzones from said web server, one of said plurality of information files relating to one of said plurality of hotzones in said second marquee display;
   g) storing said plurality of information files in a means for storing information files, housed on said client computer;
   h) installing one of said plurality of information files, relating to one of said plurality of hotzones, into the grid display storage file relating to said one of said plurality of hotzones;

i) repeating step h for each of said plurality of hotzones in said second marquee display;
j) disconnecting said client computer from said web server leaving an operating simulation of the web page on the client computer;
k) selecting a one of said plurality of hotzones;
l) accessing one of said plurality of information files stored on said client computer related to the one of said plurality of hotzones selected in step k, from said means for storing information files on said client computer;
m) displaying said grid display for said one of said plurality of hotzones; and
n) reading said one of said plurality of information files related to said one of said plurality of hotzones.

5. The method of claim 4 further comprising the steps of:
a) after step n, deleting said plurality of information files, stored on said client computer from said means for storing information files;
b) connecting the client computer to a web server through the Internet;
c) displaying a web page;
d) having said web server display a third marquee display thread having a plurality of hotzones on the client computer;
e) creating a grid display for each of said plurality of hotzones in said third marquee display;
f) downloading a plurality of information files relating to said plurality of hotzones from said web server, one of said plurality of information files relating to one of said plurality of hotzones in said third marquee display;
g) storing said plurality of information files in a means for storing information files, housed on said client computer;
h) installing one of said plurality of information files, relating to one of said plurality of hotzones, into the grid display storage file relating to said one of said plurality of hotzones;
i) repeating step g for each of said plurality of hotzones in said third marquee display;
j) disconnecting said client computer from said web server leaving an operating simulation of the web page on the client computer;
k) selecting a one of said plurality of hotzones;
l) accessing one of said plurality of information files stored on said client computer related to the one of said plurality of hotzones selected in step k, from said means for storing information files on said client computer;
m) displaying said grid display for said one of said plurality of hotzones; and
n) reading said one of said plurality of information files related to said one of said plurality of hotzones.

6. The method of claim 5 further comprising the steps of:
a) after step n, selecting another of said plurality of hotzones from said third marquee display;
b) accessing another of said plurality of information files, stored on said client computer, related to said one of said plurality of hotzones from said means for storing information files on said client computer;
c) displaying said grid display for said another of said plurality of hotzones; and
c) reading the said another of said plurality of information files related to said plurality of hotzones.

7. A method of displaying a plurality of electronic files with a minimum of latency periods, on a client computer containing a browser comprising the steps of:
a) connecting the client computer to a web server through the Internet via selection of a switch displayed on a display screen of the client computer;
b) displaying a web page;
c) having said web server display a marquee display thread having a plurality of hotzones on the client computer;
d) creating a grid display, having a storage file, for each of said plurality of hotzones;
e) downloading a plurality of information files relating to said plurality of hotzones from said web server, one of said plurality of information files relating to one of said plurality of hotzones;
f) storing said plurality of information files in a means for storing information files, housed on said client computer;
g) installing one of said plurality of information files, relating to one of said plurality of hotzones, into the grid display storage file relating to said one of said plurality of hotzones;
h) repeating step g for each of said plurality of hotzones in said marquee display;
after disconnecting said client computer from said web server via another selection of the switch:
i) selecting a one of said plurality of hotzones, without initiating contact with or receiving information from the web server;
j) accessing one of said plurality of information files stored on said client computer related to the one of said plurality of hotzones selected in step j, from said means for storing information files on said client computer, without initiating contact with or receiving information from the web server;
k) displaying said grid display for said one of said plurality of hotzones; and
l) reading said one of said plurality of information files related to said one of said plurality of hotzones.

* * * * *